(12) United States Patent
Kuhn et al.

(10) Patent No.: US 11,794,166 B1
(45) Date of Patent: *Oct. 24, 2023

(54) PEROVSKITE OXIDES FOR THERMOCHEMICAL CONVERSION OF CARBON DIOXIDE

(71) Applicant: University of South Florida, Tampa, FL (US)

(72) Inventors: John N. Kuhn, Tampa, FL (US); Debtanu Maiti, Tampa, FL (US); Yolanda A. Daza, Beaverton, OR (US); Bryan J. Hare, Orlando, FL (US); Adela E. Ramos, Tampa, FL (US); Venkat R. Bhethanabotla, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 126 days.

This patent is subject to a terminal disclaimer.

(21) Appl. No.: 17/186,528

(22) Filed: Feb. 26, 2021

Related U.S. Application Data

(63) Continuation of application No. 15/903,196, filed on Feb. 23, 2018, now Pat. No. 10,946,362.

(Continued)

(51) Int. Cl.
*B01J 21/02* (2006.01)
*B01J 23/00* (2006.01)
(Continued)

(52) U.S. Cl.
CPC .......... *B01J 23/002* (2013.01); *C01B 32/40* (2017.08); *C01F 17/32* (2020.01); *B01J 2523/23* (2013.01);
(Continued)

(58) Field of Classification Search
CPC . B01J 23/002; B01J 23/02; B01J 23/10; B01J 23/26; B01J 23/34; B01J 23/745;
(Continued)

(56) References Cited

U.S. PATENT DOCUMENTS 3,450,789 A * 6/1969 Kehl .................... C07C 5/48
423/263
3,595,809 A 7/1971 Kehl
(Continued)

FOREIGN PATENT DOCUMENTS

WO 2018222749 A1 12/2018

OTHER PUBLICATIONS

Daza, VA, "Closing a Synthetic Carbon Cycle: Carbon Dioxide Conversion to Carbon Monoxide for Liquid Fuels Synthesis." 2016, University of South Florida Graduate Thesis (135pp).

(Continued)

*Primary Examiner* — Cam N. Nguyen
(74) *Attorney, Agent, or Firm* — QUARLES & BRADY LLP

(57) ABSTRACT

Perovskite oxides and catalysts containing the perovskite oxides are provided for the thermochemical conversion of carbon dioxide to carbon monoxide. The perovskite oxides can exhibit large carbon monoxide production rates and/or low carbon monoxide production onset temperatures as compared to existing materials. Reactors are provided containing the perovskite oxides and catalysts, as well as methods of use thereof for the thermochemical conversion of carbon dioxide to carbon monoxide.

20 Claims, 25 Drawing Sheets

Related U.S. Application Data

(60) Provisional application No. 62/463,028, filed on Feb. 24, 2017.

(51) Int. Cl.

| | | |
|---|---|---|
| *B01J 23/02* | (2006.01) | |
| *B01J 23/10* | (2006.01) | |
| *B01J 23/26* | (2006.01) | |
| *B01J 23/34* | (2006.01) | |
| *B01J 23/745* | (2006.01) | |
| *B01J 23/75* | (2006.01) | |
| *B01J 23/78* | (2006.01) | |
| *B01J 23/83* | (2006.01) | |
| *B01J 23/86* | (2006.01) | |
| *B01J 23/88* | (2006.01) | |
| *C01B 32/40* | (2017.01) | |
| *C01F 17/32* | (2020.01) | |

(52) U.S. Cl.
CPC ........ *B01J 2523/25* (2013.01); *B01J 2523/31* (2013.01); *B01J 2523/3706* (2013.01); *B01J 2523/67* (2013.01); *B01J 2523/72* (2013.01); *B01J 2523/842* (2013.01); *B01J 2523/845* (2013.01); *C01P 2002/34* (2013.01)

(58) Field of Classification Search
CPC ... B01J 23/75; B01J 23/78; B01J 23/83; B01J 23/86; B01J 23/862; B01J 23/864; B01J 23/8892; B01J 21/02; C01B 32/40; C01F 17/32
See application file for complete search history.

(56) References Cited

U.S. PATENT DOCUMENTS

| | | | |
|---|---|---|---|
| 3,644,147 A | 2/1972 | Young | |
| 3,884,837 A | 5/1975 | Remeika et al. | |
| 4,237,032 A * | 12/1980 | Evans | B01J 23/8933 |
| | | | 502/328 |
| 4,485,191 A | 11/1984 | Sekido et al. | |
| 4,601,883 A | 7/1986 | Sekido et al. | |
| 4,921,829 A * | 5/1990 | Ozawa | B01D 53/945 |
| | | | 502/302 |
| 5,055,440 A * | 10/1991 | Chu | B01D 53/945 |
| | | | 502/524 |
| 5,149,516 A | 9/1992 | Han et al. | |
| 5,260,248 A | 11/1993 | Singh et al. | |
| 5,443,807 A | 8/1995 | Tang et al. | |
| 5,447,705 A | 9/1995 | Petit et al. | |
| 5,518,937 A * | 5/1996 | Furumura | H01L 29/0817 |
| | | | 148/DIG. 1 |
| 5,622,680 A | 4/1997 | Monceaux et al. | |
| 5,817,597 A | 10/1998 | Carolan et al. | |
| 5,821,185 A | 10/1998 | White et al. | |
| 5,939,354 A | 8/1999 | Golden | |
| 5,977,017 A | 11/1999 | Golden | |
| 6,129,862 A * | 10/2000 | Munakata | B01J 23/83 |
| | | | 252/519.15 |
| 6,146,445 A * | 11/2000 | Chen | B01D 71/024 |
| | | | 502/304 |
| 6,146,549 A * | 11/2000 | Mackay | B01D 69/141 |
| | | | 502/4 |
| 6,352,955 B1 | 3/2002 | Golden | |
| 6,521,202 B1 * | 2/2003 | Vaughey | B01J 23/34 |
| | | | 429/223 |
| 6,569,803 B2 | 5/2003 | Takeuchi | |
| 6,800,388 B2 | 10/2004 | Kaneko et al. | |
| 6,821,498 B2 * | 11/2004 | Vaughey | H01M 4/9016 |
| | | | 423/599 |
| 6,916,570 B2 * | 7/2005 | Vaughey | B01J 23/002 |
| | | | 429/495 |
| 7,014,825 B2 * | 3/2006 | Golden | F01N 3/281 |
| | | | 423/247 |
| 7,074,370 B2 | 7/2006 | Segal et al. | |
| 7,375,054 B2 * | 5/2008 | Eguchi | B01D 53/944 |
| | | | 502/328 |
| 7,381,394 B2 | 6/2008 | Tanaka et al. | |
| 7,514,055 B2 * | 4/2009 | Golden | B01J 23/83 |
| | | | 502/328 |
| 7,572,751 B2 | 8/2009 | Isogai et al. | |
| 7,576,032 B2 * | 8/2009 | Tanaka | B82Y 30/00 |
| | | | 502/328 |
| 7,592,090 B2 * | 9/2009 | Seabaugh | H01M 4/8885 |
| | | | 252/519.15 |
| 8,226,915 B2 | 7/2012 | Qi et al. | |
| 8,268,274 B2 | 9/2012 | Kim et al. | |
| 8,943,811 B2 | 2/2015 | Li et al. | |
| 8,974,764 B2 * | 3/2015 | Ifrah | C01G 45/1264 |
| | | | 423/599 |
| 9,616,413 B2 * | 4/2017 | Waller | B01J 23/002 |
| 9,649,596 B2 * | 5/2017 | Chang | F01N 3/2066 |
| 9,815,702 B1 | 11/2017 | Kuhn et al. | |
| 9,855,550 B2 * | 1/2018 | Matsueda | B01J 37/343 |
| 9,873,109 B2 * | 1/2018 | Yamazaki | B01J 35/002 |
| 9,878,308 B2 * | 1/2018 | Ito | B01J 23/89 |
| 9,901,915 B2 * | 2/2018 | Ifrah | C01G 49/0054 |
| 9,983,165 B2 | 5/2018 | Ueda et al. | |
| 10,486,143 B2 * | 11/2019 | Li | B01J 23/005 |
| 11,179,704 B2 * | 11/2021 | Zheng | C01B 3/04 |
| 11,401,023 B2 * | 8/2022 | Spry | B64C 1/20 |
| 2002/0022568 A1 * | 2/2002 | Mackay | C01B 13/0255 |
| | | | 423/594.2 |
| 2004/0214070 A1 * | 10/2004 | Simner | H01M 4/8885 |
| | | | 429/432 |
| 2005/0164890 A1 | 7/2005 | Zeng et al. | |
| 2015/0129805 A1 | 5/2015 | Karpenko et al. | |
| 2015/0162621 A1 * | 6/2015 | Nada | C04B 35/2633 |
| | | | 502/303 |
| 2015/0182954 A1 | 7/2015 | Nazarpoor et al. | |

OTHER PUBLICATIONS

Gibbons, J. et al., "Carbon Capture and Storage" 2008, Energy Policy, 36:4317-4-322.
Inoue, T. et al., "Hydrogenation of Carbon Dioxide and Carbon Monoxide over Supported Rhodium Catalysts under 10 Bar Pressure," 1989, Applied Catalysis, 46:1-9.
Kresse, G. et al., "Efficiency of ab-initio Total Energy Calculations for Metals and Semiconductors using a Plane Wave Basis Set," 1996, Computational Materials Science, 6:15-50.
Nomura, K. et al., "Oxidative Coupling of Methane on Perovskite Oxides, (Ba, Ca)(Co, Fe)O3-(delta)," 1993, "Applied Catalysis A: General" 101 :63-72.
Abe, T. et al., "CO2 Methanation Property of Ru Nanoparticle-Loaded TiO2 Prepared by a Polygonal Barrel-Sputtering Method," 2009, Energy and environmental Science. 2:315-321.
Biesinger, M.C. et al., "Resolving Surface Chemical States in XPS Analysis of First Row Transition Metals, Oxides and Hydroxides: Cr, Mn, Fe, Co and Ni," 2011, Applied Surface Science, 257:2717-2730.
Bork, A.H. et al., "Perovskite La0.6Sr0.4Cr1—xCoxO3-(delta) Solid Solutions for Solar-Thermochemical Fuel Production: Strategies to Lower the Operation Temperature," 2015, Journal of Materials Chemistry A, 3:15546-15557.
Calle-Vallejo, F. et al., "Physical and Chemical Nature of the Scaling Relations between Adsorption Energies of Atoms on Metal Surfaces," 2012, Physical Review Letters, 108:116103.
Carbon Recycling International, Website, https://www.carbonrecycling.is/, accessed Aug. 13, 2019, 26pp.
Centi, G. et al., "Catalysis for CO2 Conversion: A Key Technology for Rapid Introduction of Renewable energy in the Value Chain of Chemical Industries," 2013, Energy and Environmental Science, 6:1711-1731.
Centi, G. et al., "Opportunities and Prospects in the Chemical Recycling of Carbon Dioxide to Fuels," 2009, Catalysis Today, 148:191-205.

(56) References Cited

OTHER PUBLICATIONS

Chen, C.-F. et al., "Oxygen-deficient BaTiO3-x Perovskite as an Efficient Bifunctional Oxygen Electrocatalyst," 2015, Nano Energy, 13:423-432.

Cheng, D. et al., "Computational Approaches to the Chemical Conversion of Carbon Dioxide," 2013, ChemSusChem, 6:944-965.

Chueh, W.C. et al., "High-Flux Solar-Driven Thermochemical Dissociation of CO2 and H2O Using Nonstoichiometric Ceria," 2010, Science, 330:1797-1801.

Curnan, M.T. et al., "Effects of Concentration, Crystal Structure, Magnetism, and Electronic Structure Method on First-Principles Oxygen Vacancy Formation Energy Trends in Perovskites," 2014, Journal of Physical Chemistry C, 118:28776-28790.

Daza, Y.A. et al., "Carbon Dioxide Conversion by Reverse Water-Gas Shift Chemical Looping on Perovskite-Type Oxides," 2014, Industrial and Engineering Chemistry Research, 53:5828-5837.

Daza, Y.A. et al., "Isothermal Reverse Water Gas Shift Chemical Looping on LaO. 75SrO. 24Co (1-Y) FeYO3 Perovskite-Type Oxides," 2015, Catalysis Today, 258:691-698.

Daza, Y.A. et al., "More Cu, More Problems: Decreased CO2 Conversion Ability by Cu-Doped La0.75Sr0.25FeO3 Perovskite Oxides," 2016, Surface Science, 648:92-99.

Demi, A.M. et al., "Oxide Enthalpy of Formation and Band Gap Energy as Accurate Descriptors of Oxygen Vacancy Formation Energetics," 2014, Energy and environmental Science, 7:1996-2004.

Deml, AM et al., "Intrinsic Material Properties Dictating oxygen Vacancy Formation Energetics in Metal Oxides," 2015, The Journal of Physical Chemistry Letters, 6:1948-1953.

Deml, A.M. et al., "Tunable Oxygen Vacancy Formation Energetics in the Complex Perovskite Oxide SrxLa1—xMnyAl1—yO3," 2014, Chemistry of Materials, 26:6595-6602.

Dharanipragada, N.V.R.A. et al., "Mg—Fe—Al—O for advanced Co2 to Co conversion: carbon monoxide yield vs. oxygen storage capacity," 2015, Journal of Mater. Chem. A, 3: 16251-16262.

Druce, J. et al., "Surface Termination and Subsurface Restructuring of Perovskite-Based Solid Oxide Electrode Materials," 2014, Energy and Environmental Science, 7:3593-3599.

Fernandez, E.M. et al., "Scaling Relationships for Adsorption Energies on Transition Metal Oxide, Sulfide, and Nitride Surfaces," 2008, Angewandte Chemie Internaional Edition, 47:4683-4686.

Furler, P. et al., "Solar Thermochemical CO2 Splitting Utilizing a Reticulated Porous Ceria Redox System," 2012, Energy and Fuels, 26:7051-7059.

Furler, P. et al., "Syngas Production by Simultaneous Splitting of H2O and CO2 via Ceria Redox Reactions in a High-Temperature Solar Reactor," 2012, Energy and Environmental Science, 5:6098-6103.

Galvita, V.V. et al., "CeO2-Modified Fe2O3 for CO2 Utilization via Chemical Looping," 2013, Industrial and Engineering Chemistry Research, 52:8416-8426.

Gines, M.J. L. et al., "Kinetic Study of the Reverse Water-Gas Shift Reaction over CuO/ZnO/Al2O3 Catalysts," 1997, Applied Catalysis A: General, 154:155-171.

Global Carbon Capture and Storage Institute, "The Global Status of CCS: 2016 Summary Report," 2016 https://www.globalccsinstitute.com/wp-content/uploads/2018/12/Global-Status-Report-2016_Summary .pdf accessed Aug. 13, 2019, 28pp.

Graves, C. et al., "Sustainable Hydrocarbon Fuels by Recycling CO2 and H2O with Renewable or Nuclear energy," 2011, Remewable and Sustainable Energy Reviews, 51 :1-23.

Hohenberg, P. et al., "Inhomogeneous Electron Gas," 1964, Physical Review, 136:B864-B871.

Huang, Y., et al., "Enhanced Photoreduction Activity of Carbon Dioxide over Co3O4/CeO2 Catalysts under Visible Light Irradiation," 2015, International Journal of Photoenergy, 2015: 11 pp.

International Energy Agency, "Carbon Capture and Storage: The Solution for Deep Emissions Reductions," 2015, 12pp.

Izumi, Y., "Recent Advances in the Photocatalytic Conversion of Carbon Dioxide to Fuels with Water and/or Hydrogen Using Solar Energy and Beyond," 2013, Coordination Chemistry Reviews, 257:171-186.

Jos, G.J.M. et al., "Trends in Global CO2 Emissions," 2015 https://edgar.jrc.ec.europa.eu/news_docs/jrc-2015-trends-in-global-co2-emissions-2015-report-98184.pdf accessed Aug. 13, 2019, 80pp.

Kaiser, P. et al., "Production of Liquid Hydrocarbons with CO2 as Carbon Source Based on Reverse Water-Gas Shift and Fischer-Tropsch Synthesis," 2013, Chemie Ingenieur Technik, 85:489-499.

Kohn, W. et al., "Self-Consistent Equations Including Exchange and Correlation Effects," 1965, Pysical Review, 140: A 1133-A 1138.

Kolmakov, A. et al., "Chemical Sensing and Catalysis by One-Dimensional Metal-Oxide Nanostructures," 2004, Annual Review of Materials Research, 34:151-180.

Kondratenko, E.V., et al., "Status and Perspectives of CO2 Conversion into Fuels and Chemicals by Catalytic, Photocatalytic and Electrocatalytic Processes," 2013, Energy and Environmental Science, 6:3112-3135.

Krcha, M.D. et al., "Periodic Trends of Oxygen Vacancy Formation and C-H Bond Activation over Transition Metal- Doped CeO2 (1 1 1) Surfaces," 2012, Journal of Catalysis, 293:103-115.

Kresse, G. et al., "Ab initio Molecular Dynamics for Liquid Metals," 1993, Physical Review B, 47:558-561.

Kresse, G. et al., "Efficient Iterative Schemes for ab initio Total-Energy Calculations using a Plane-Wave Basis Set," 1996, Physical Review B, 54:11169-11186.

Kresse, G. et al., "From ultrasoft pseudopotentials to the projector augmented-wave method," 1999, Physical Review B, 59:1758-1775.

Kuhn, J.N. et al., "Surface Properties of Sr- and Co-doped Lai=eO3," 2008, Journal of Catalysis, 253:200-211.

Lebouvier, A. et al., Assessment of Carbon Dioxide Dissociation as a New Route for Syngas Production: A Comparative Review and Potential of Plasma-Based Technologies,: 2013, Energy and Fuels, 27:2712-2722.

Li, K. et al., "A Critical Review of CO2 Photoconversion: Catalysts and Reactors," 2014, Catalysis Today, 224:3-12.

Lorentzou, S. et al., "Thermochemical CO2 and CO2/H2O Splitting over NiFe2O4 for Solar Fuels Synthesis," 2014, Energy Procedia, 49:1999-2008.

Ma, X. et al., "Engineering Complex, Layered Metal Oxides: High-Performance Nickelate Oxide nanostructures for Oxygen Exchange and Reduction," 2015, ACS Catalysis, 5:4013-4019.

Maiti, D. et al., "Oxygen Vacancy Formation Characteristics in the Bulk and Across Different surface Terminations of a(1-x)SrxFe(1-y)CoyO(3-(delta)) Perovskite Oxides for CO2 Conversion," 2016, Journal of Materials Chemistry A, 4:5137-5148.

Mallapragada, D.S. et al., "Sun-to-Fuel Assesment of Routes for Fixing CO2 as Liquid Fuel," 2013, Industrial and Engineering Chemistry Research, 52:5136-5144.

Markewitz, P. et al., "Worldwide Innovations in the Development of Carbon Capture Technologies and the Utilization of CO2," 2012, Energy and Environmental Science, 5:7281-7305.

McDaniel, A.H. et al., "Sr- and Mn-Doped LaAlO3-(delta) for Solar Thermochemical H2 and CO Production," 2013, Energy and Environmental Science, 6:2024-2028.

Mefford, J.T. et al., "Water Electrolysis on La(1-x)Sr(x)CoO(3-(delta)) Perovskite Electrocatalysts," 2016, Nature Communications, 7: 11053.

Michalsky, R. et al., "Departures from the Adsorption Energy Scaling Relations for Metal Carbide Catalysts," 2014, The Journal of Physical chemistry C, 118:13026-13034.

Miller, J.E. et al., "Metal Oxide Composites and Structures for Ultra-High Temperature Solar Thermochemical Cycles," 2008, Journal of Materials Science, 43:4714-4728.

Monkhorst, H.J. et al., "Special Points for Brillouin-zone Integrations," 1976, Physical Review B, 13:5188-5192.

New CO2 Fuels, Website, http://www.newco2fuels.co.il/, accessed Aug. 13, 2019, 16pp.

Nohira, H. et al., "Characterization of ALCVD—Al2O3 and ZrO2 Layer using X-Ray Photoelectron Spectroscopy," 2002, Journal of Non-Crystalline Solids, 303:83-87.

(56) References Cited

OTHER PUBLICATIONS

Pena, MA et al., "Chemical Structures and Performance of Perovskite Oxides," 2001, Chemical Reviews, 101:1981-2017.

Perdew, J.P. et al., "Generalized Gradient Approximation Made Simple," 1996, Physical Review Letters, ? 77:3865-3868.

Popa, M. et al., "Synthesis of Lanthanum Cobaltite (LaCo03) by the Polymerizable Complex Route," 2002, Solid State Ionics, 151:251-257.

Porosoff, M.D. et al., "Catalytic Reduction of CO2 by H2 for Synthesis of CO, Methanol and Hydrocarbons: Challenges and Opportunities," 2016, Energy and Environmental Science, 9:62-73.

Redfern, SAT., "High-Temperature Structural Phase Transitions in Perovskite (CaTiO3)," 1996, Journal of Physics: Condensed Matter, 8:8267-8275.

Riedel, T. et al., "Kinetics of CO2 Hydrogenation on a K-Promoted Fe Catalyst," 2001, Industrial and Engineering Chemistry Research, 40: 1355-1363.

Rihko-Struckmann, L.K. et al., "Hydrogen and Carbon Monoxide Production by Chemical Looping over Iron-Aluminium Oxides," 2016, Energy Technology, 4:304-313.

Scheffe, J.R. et al., "Lanthanum-Strontium-Manganese Perovskites as Redox Materials for Solar Thermochemical Splitting of H2O and CO2," 2013, Energy and Fuels, 27:4250-4257.

Solar-Jet, Website, http://www.solar-jet.aero/, accessed Aug. 13, 2019, 9pp.

Suntivich, J. et al., "A Perovskite Oxide Optimized for Oxygen Evolution Catalysis from Molecular Orbital Principles," 2011, Science, 334:1383.

Suntivich, J. et al., "Design Principles for Oxygen-Reduction Activity on Perovskite Oxide Catalysts for Fuel Cells and Metal-Air Batteries," 2011, Nature Chemistry, 3:546-550.

Svarcova, S. et al., "Structural Instability of Cubic Perovskite BaxSr1—xCo1—yFeyO3—d," 2008, Solid State Ionics, 178:1787-1791.

Tan, H. et al., "Oxygen Vacancy enhanced Photocatalytic Activity of Pervoskite SrTiO3," 2014, ACS Applied Materials and Interfaces, 6:19184-19190.

Thermo Scientific, "Advantage Data System for XPS," httpJ/xpssimplified.com/periodictable.php accessed Aug. 13, 2019.

Torregrosa-Rivero, V. et al., "Coper Doped BaMnO3 Perovskite Catalysts for NO Oxidation and NO2-Assisted Diesel Soo Removal," 2017, RSC Advances, 7:35228-35238.

Uhlig, I. et al., "Surface States and Reactivity of Pyrite and Marcasite," 2001, Applied Surface Science, 179:222-229.

Wang, L. et al., "Oxidation Energies of Transition Metal Oxides within the GGA + U Framework," 2006, Physical Review B, 73:195107.

Wang, W. et al., "Recent Advances in Catalytic Hydrogenation of Carbon Dioxide," 2011, Chemical Society Reviews, 40:3703-3727.

Wenzel, M. et al., "CO Production from CO2 via Reverse Water-Gas Shift Reaction Performed in a Chemical Looping Mode: Kinetics on Modified Iron Oxide," 2017, Journal of CO2 Utilization, 17:60-68.

Wenzel, M. et al., "thermodynamic Analysis and Optimization of RWGS Processes for Solar Syngas Production from CO2," 2016, AIChE Journal, 63:15-22.

Wu, H.-C., "Effects of Oxygen Vacancy Order-Disorder Phase Transition on Air Separation by Perovskite Sorbents," 2017, Industrial and Engineering Chemistry Research, 56:6057-6064.

Zhu, K. et al., "Perovskites Decorated with oxygen Vacancies and Fe—Ni Alloy Nanoparticles as High-Efficiency Electrocatalysts for the Oxygen Evolution Reaction," 2017, Journal of Materials Chemistry A, 5:19836-19845.

* cited by examiner

PEROVSKITE OXIDES FOR THERMOCHEMICAL CONVERSION OF CARBON DIOXIDE

CROSS-REFERENCE TO RELATED APPLICATIONS

This application claims the benefit of and priority to co-pending U.S. Nonprovisional patent application Ser. No. 15/903,196, filed on Feb. 23, 2018, entitled "PEROVSKITE OXIDES FOR THERMOCHEMICAL CONVERSION OF CARBON DIOXIDE," which claims priority upon U.S. Provisional Patent Application No. 62/463,028, filed on Feb. 24, 2017, entitled "PEROVSKITE OXIDES FOR THERMOCHEMICAL CONVERSION OF CARBON DIOXIDE," the contents of which are incorporated by reference herein in its entirety.

STATEMENT REGARDING FEDERALLY SPONSORED RESEARCH OR DEVELOPMENT

This invention was made with government support CBET1335817 awarded by the National Science Foundation. The Government has certain rights in the invention.

TECHNICAL FIELD

The present disclosure generally relates to perovskite oxides and uses thereof.

BACKGROUND

Carbon capture and sequestration (CCS) (1) has attracted a lot of interest and investment owing to its promise towards $CO_2$ mitigation. However, its scale of operation (27 Mt, as of 2015) (2) is far below the annual global $CO_2$ emissions (~35 Gt, as of 2015) (3). A significant amount of research has been directed to repurposing the abundant $CO_2$ towards generation of high value hydrocarbons. This perspective of $CO_2$ utilization (CCU) (4, 5) has garnered a lot of attention in recent years (6, 7).

Amongst the various methodologies, solar thermochemical routes have been argued to be promising as energy from intermittent sources can be stored in chemical form (8-11). A major limitation of solar thermochemical $CO_2$ conversion is the high temperatures (more than 1000° C.) required for the process. In theory, reverse water gas shift chemical looping (RWGS-CL) (12, 13) can address this problem. Using hydrogen as a reducing agent, process temperatures can be lowered to about 500-600° C. With efficient $CO_2$ conversion rates of c.a. 100 μmoles/min/gram of catalyst (12, 13), this process can outpace photocatalytic $CO_2$ conversion process (FIG. 1). The data for the temperature of operation and the product formation rates has been based on the literature values (8, 12, 13, 36, 37). The figure clearly portrays the superiority of RWGS-CL over conventional thermochemical conversion of $CO_2$ to CO, due to its ability to perform at much lower temperatures. When hydrogen produced from solar energy is used, the sun-to-fuel (STF) efficiency of $CO_2$ extraction and thermochemical conversion with hydrogen exceeds that of direct photosynthetic and biofuel-based routes(11). The RWGS-CL process can even further improve the STF efficiency as it is more adept at syngas production than its catalytic counterpart even at 800° C. (14).

There remains a need for improved catalysts for thermochemical conversion of carbon dioxide, for example using the reverse water gas shift chemical looping that overcome the aforementioned deficiencies.

SUMMARY

A variety of perovskite oxides, catalysts containing perovskite oxides, and methods of use thereof are provided that overcome one or more of the aforementioned deficiencies. In one or more embodiments, a perovskite oxide is provided having a composition according to the formula $A^1_x A^2_{(1-x)} B_1 O_3$, the formula $A_1 B^1_y B^2_{(1-y)} O_3$, or the formula $A^1_x A^2_{(1-x)} B^1_y B^2_{(1-y)} O_3$. In some aspects, x is about 0.2 to 0.8, and y is about 0.2 to 0.8. The elements A, $A^1$, and $A^2$ can be independently selected from the group La, Ca, and Ba, provided that $A^1$ and $A^2$ are not the same. The elements B, $B^1$, and $B^2$ can be independently a transition metal, provided that $B^1$ and $B^2$ are not the same. For example, in some aspects, B, $B^1$, and $B^2$ are independently selected from the group Al, Fe, Mn, Cr, and Co.

The perovskite oxide can have a composition according to the formula $A^1_x A^2_{(1-x)} B_1 O_3$, wherein $A^1$ is La. The perovskite oxide can have a composition according to the formula $A_1 B^1_y B^2_{(1-y)} O_3$, wherein $A^1$ is La. The perovskite oxide can have a composition according to the formula $A^1_x A^2_{(1-x)} B^1_y B^2_{(1-y)} O_3$, wherein $A^1$ is La. Particular examples of the perovskite oxide can, in some embodiments, include one or more of $La_{0.6}Ca_{0.4}MnO_3$, $La_{0.6}Ca_{0.4}Fe_{0.4}Mn_{0.6}O_3$, $La_{0.6}Ca_{0.4}Al_{0.4}Mn_{0.6}O_3$, $La_{0.6}Ba_{0.4}Fe_{0.6}Al_{0.4}O_3$, $La_{0.6}Ca_{0.4}Cr_{0.4}Mn_{0.6}O_3$, $La_{0.6}Ca_{0.4}Cr_{0.6}Al_{0.4}O_3$, $La_{0.6}Ca_{0.4}Cr_{0.6}Fe_{0.4}O_3$, $La_{0.6}Ba_{0.4}Mn_{0.6}Fe_{0.4}O_3$, $La_{0.6}Ba_{0.4}MnO_3$, $La_{0.6}Ba_{0.4}Mn_{0.6}Cr_{0.4}O_3$, $La_{0.6}Ba_{0.4}Cr_{0.8}Co_{0.2}O_3$, $La_{0.6}Ca_{0.4}Cr_{0.8}Co_{0.2}O_3$, and $La_{0.6}Ba_{0.4}Cr_{0.6}Fe_{0.4}O_3$.

A variety of catalysts are provided including one or more of the perovskite oxides. The catalyst can include a perovskite oxide described herein, wherein the perovskite oxide has been packed into at least one structure for packing a chemical reactor, wherein the structure is selected from the group of beads, pellets, and fluidized bed powders. The catalyst can include a substrate and a perovskite oxide described herein, for example supported on a surface of the substrate. The substrate can include a monolith having the perovskite oxide deposited on at least a surface of the monolith. Suitable monoliths, in some aspects, include a metal such as platinum, a cordierite, a mullite, or a silicon carbide. The monolith can include a Brunauer, Emmet, and Teller (BET) specific surface area of about 5 m$^2$/g to 100 m$^2$/g. Packed bed reactors are also provided including a catalyst described herein.

Methods of using the perovskite oxides and catalysts described herein are also provided. The methods can be used for the conversion of carbon dioxide to carbon monoxide. In some embodiments, the methods include contacting a perovskite or a catalyst described herein with hydrogen gas at a first elevated temperature to produce an oxygen-deficient perovskite oxide, and contacting the oxygen-deficient perovskite oxide with the carbon dioxide at a second elevated temperature to produce the carbon monoxide. The first elevated temperature can be about 350° C. to 600° C., about 400° C. to 600° C., or about 500° C. to 600° C. The second elevated temperature can be about 400° C. to 800° C. or about 440° C. to 750° C. In some aspects, a low temperature can be used for the second elevated temperature because the perovskite oxides exhibit a low onset temperature. In some aspects, the second elevated temperature is about 440° C. to about 550° C. In some aspects, the carbon monoxide can be produced at a rate of about 140 μmoles g$^{-1}$ min$^{-1}$ to 400

µmoles g$^{-1}$ min$^{-1}$ or about 140 µmoles g$^{-1}$ min$^{-1}$ to 275 µmoles g$^{-1}$ min$^{-1}$ based upon the mass of the perovskite oxide.

This materials and methods described herein exhibit efficient $CO_2$ to CO conversion abilities via RWGS-CL process. RWGS-CL is an approach of converting $CO_2$ to CO, thus addressing the global need to $CO_2$ reduction and subsequently it paves the path for high value hydrocarbon generation from the CO produced. To date, we were limited to only $La_{0.75}Sr_{0.25}FeO_3$, that exhibited promising performance at low temperatures of ~550° C., with CO yield of 1210 µmoles/g catalyst. Materials and methods described herein have broken that barrier, and the materials (with combinations of La, Ca and Ba on the 'A' site and combinations of Cr, Mn, Fe and Al on the 'B' site) allows of improved $CO_2$ conversion performance in RWGS-CL processes.

Other systems, methods, features, and advantages of perovskite oxides, catalysts, and methods of use thereof will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

(FIG. 5A) The deviation of $E_{vac}$ of the perovskite oxides with respect to that of $La_{0.75}Sr_{0.25}FeO_3$ ($E_{vac,\ ABO3} - E_{vac,\ La0.75Sr0.25FeO3}$); Positive deviation implies higher resistance to oxygen vacancy formation and negative deviation implies relatively easier oxygen vacancy formation; the materials in the zone (0±0.5 eV) form our predicted set. (FIG. 5B) CO yields of predicted materials as obtained from the temperature programmed experiments; $La_{0.6}Ca_{0.4}MnO_3$ shows the highest yield till date at 550° C. (FIG. 5C) Empirical modeling of $E_{vac}$ as a function of $H_f$ and bond dissociation energies. (FIG. 5D) Prediction of $E_{vac}$ for $A1_{0.5}A2_{0.5}B1_{0.5}B2_{0.5}O_3$ using the empirical model, showing close match to DFT based results. (FIG. 5E) $CO_2$ conversion performance by $La_{0.6}Ca_{0.4}Fe_{0.4}Mn_{0.6}O_3$ perovskite oxide in RWGS-CL cycles at 550° C. (FIG. 5F) Structural stability of $La_{0.6}Ca_{0.4}Fe_{0.4}Mn_{0.6}O_3$ after TPO-$CO_2$ and 5 RWGS-CL cycles, showing the potential for using these materials over several cycles.

(FIG. 7A) Average $E_{ads}$ over pure stoichiometric surfaces of $ABO_3$. (FIG. 7B) Average $E_{ads}$ over oxygen deficient surfaces of $ABO_3$. (FIG. 7C) $E_{ads}$ over pure stoichiometric 'AO' surface terminations of $ABO_3$. (FIG. 7D) $E_{ads}$ over oxygen vacant 'AO' surface terminations of $ABO_3$. (FIG. 7E) $E_{ads}$ over pure stoichiometric '$BO_2$' surface terminations of $ABO_3$. (FIG. 7F) $E_{ads}$ over oxygen vacant '$BO_2$' surface terminations of $ABO_3$.

(FIGS. 9A-9C) the TEM images for $La_{0.75}Sr_{0.25}FeO_3$, $La_{0.6}Ca_{0.4}MnO_3$, and $La_{0.6}Ca_{0.4}Fe_{0.4}Mn_{0.6}O_3$, while the respective HRTEM images are shown through FIGS. 9D-9F, SEM micrograph of $La_{0.6}Ca_{0.4}Fe_{0.4}Mn_{0.6}O_3$ is shown in FIG. 9G, while the EDS maps for each element are shown in FIGS. 9H-9L.

(FIG. 10A) change in 'A' site and 'B' site surface elemental composition for $La_{0.75}Sr_{0.25}Fe_3$, $La_{0.6}Ca_{0.4}MnO_3$, and $La_{0.6}Ca_{0.4}Fe_{0.4}Mn_{0.6}O_3$ samples at pre and post reaction conditions. (FIG. 10B-10F) XPS profiles of the constituent elements of $La_{0.6}Ca_{0.4}Fe_{0.4}Mn_{0.6}O_3$ showing the binding energy corresponding to different orbitals.

(FIG. 11A) Average energy for $O_2$ adsorption at different sites of pure 'AO' and '$BO_2$' terminations of (100) facets of $ABO_3$. (FIG. 11B) Average energy for $O_2$ adsorption at different sites of oxygen vacant (δ=0.125) 'AO' and '$BO_2$' terminations of (100) facets of $ABO_3$. (FIG. 11C) Surface specificity: average $O_2$ adsorption energies over 'AO' sites of pure and oxygen deficient perovskites. (FIG. 11D) Surface specificity: average $O_2$ adsorption energies over '$BO_2$' sites of pure and oxygen deficient perovskites.

(FIG. 13B) The fitted model of $E_{vac}$ was used to calculate the energies for $Al_{0.5}A2_{0.5} B1_{0.5}B2_{0.5}O_3$ system of perovskites. The DFT-calculated energy matched well with that from the empirical model.

DETAILED DESCRIPTION

Figure 1:
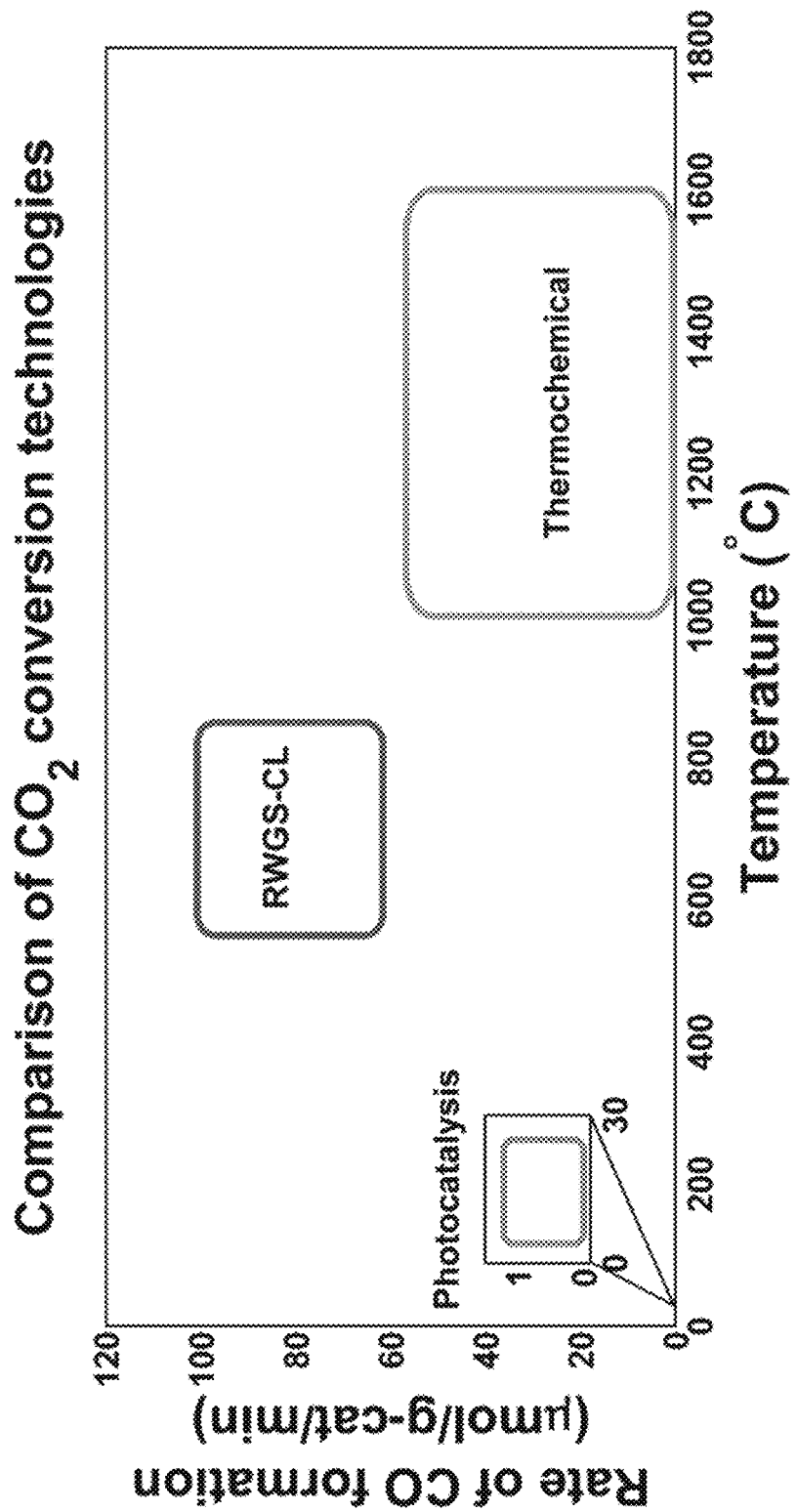
FIG. 1 is a graph comparing $CO_2$ conversion rates and operation temperatures of photocatalytic, thermochemical and RWGS-CL processes.
Figure 2:
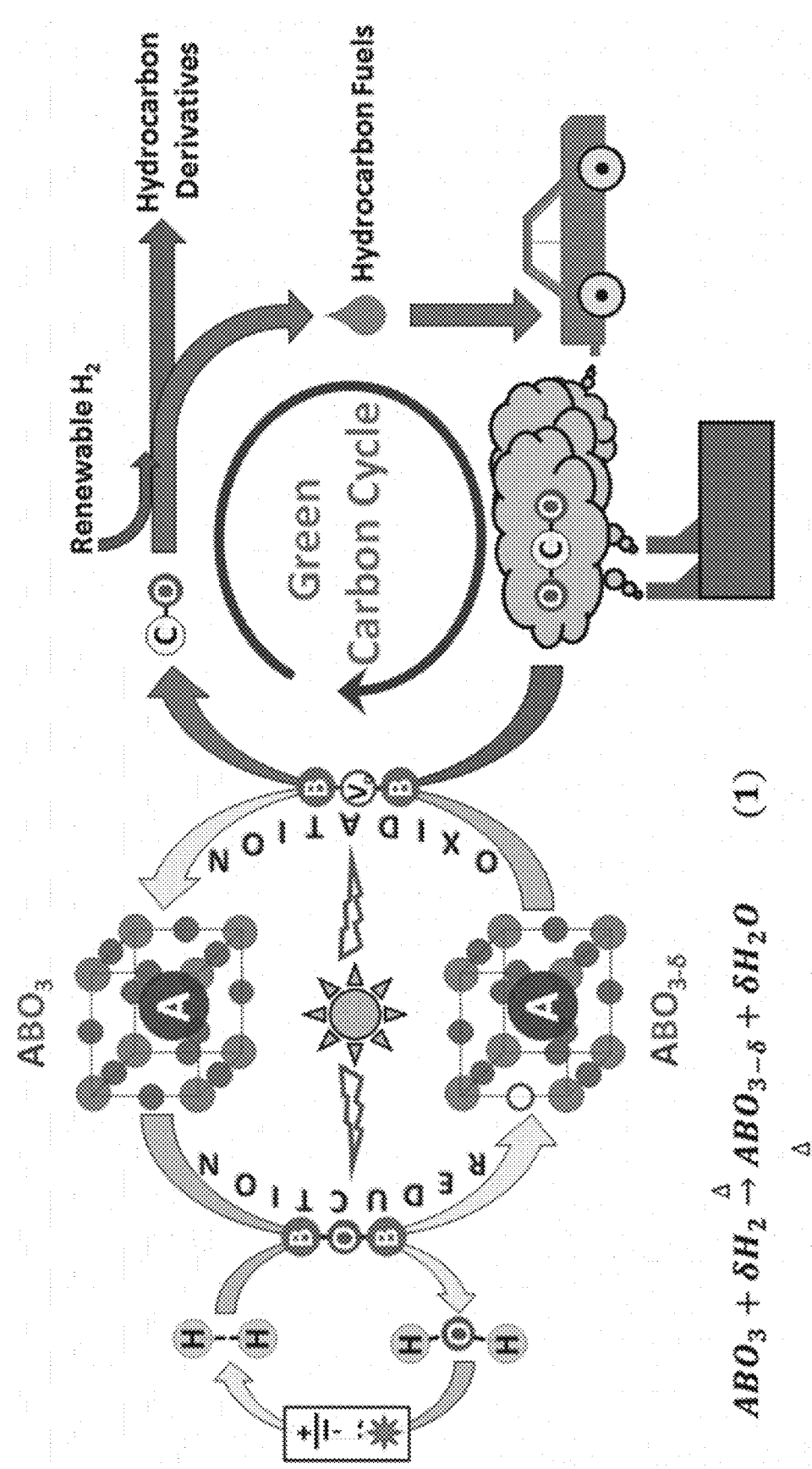
FIG. 2 is a schematic of the reverse water gas shift chemical looping (RWGS-CL) process for $CO_2$ conversion to CO over $ABO_3$ type of perovskite oxides. Equation (1) and (2) represent the reduction and oxidation steps of RWGS-CL respectively. A sustainable green carbon cycle is foreseen whereby any $CO_2$ emission is repurposed towards hydrocarbon generation.
Figures 3A, 3B, 3C, 3D:
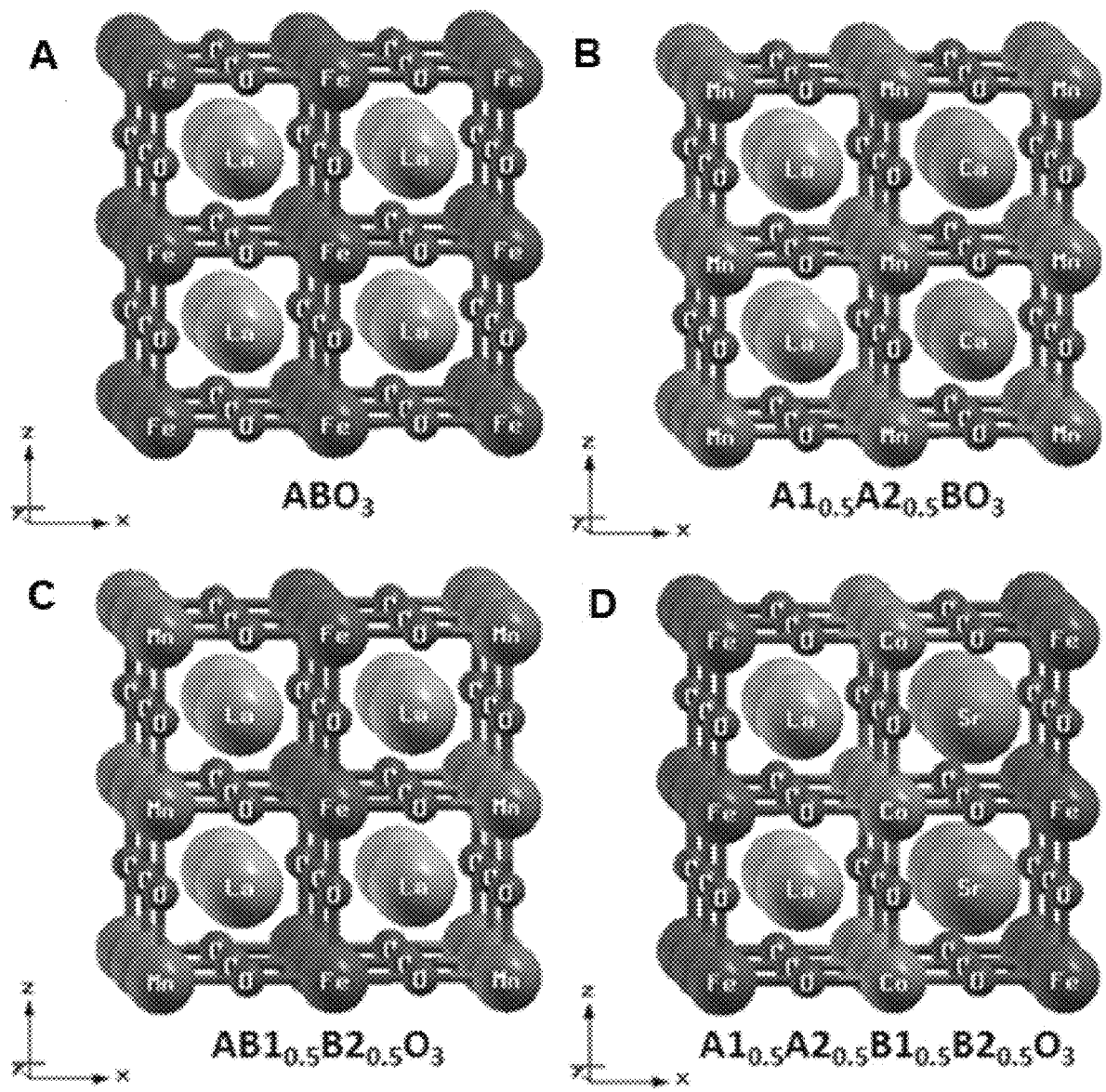
FIG. 3A-3D depict the representative relaxed crystal structures of (FIG. 3A) $ABO_3$, (FIG. 3B) $A1_{0.5}A2_{0.5}BO_3$, (FIG. 3C) $AB1_{0.5}B2_{0.5}O_3$, and (FIG. 3D) $A1_{0.5}A2_{0.5}B1_{0.5}B2_{0.5}O_3$.
Figure 4A:
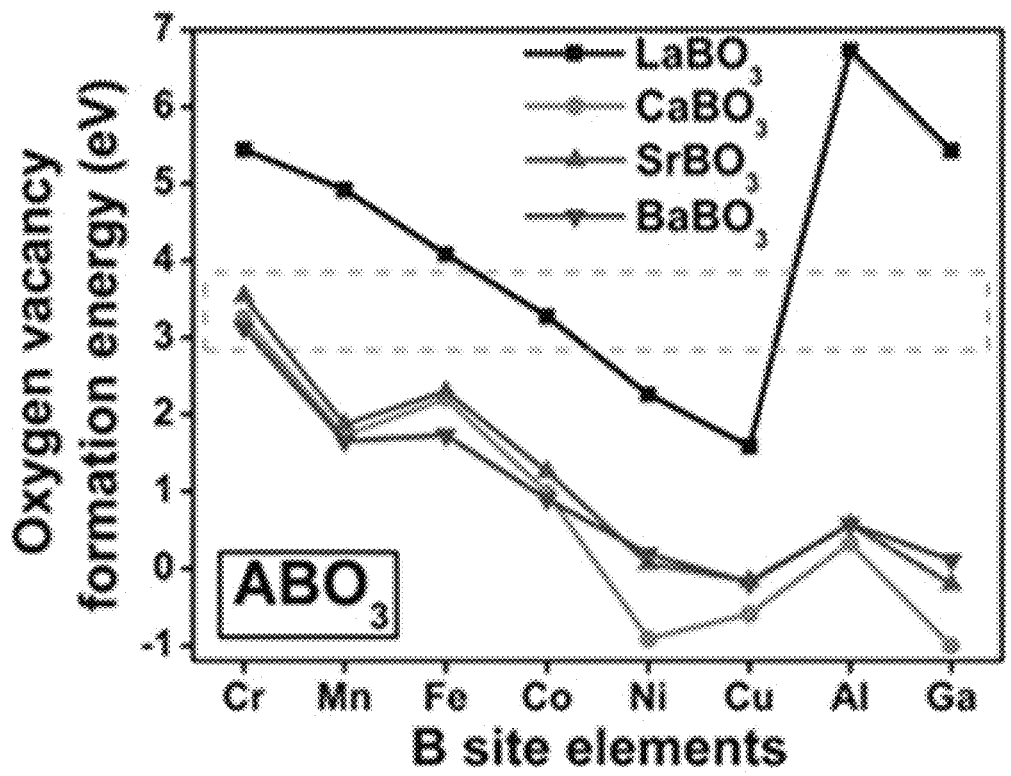
FIGS. 4A-4D are graphs of the oxygen vacancy formation energies ($E_{vac}$) across different perovskite oxides of type (FIG. 4A) $ABO_3$, (FIG. 4B) $A1_{0.5}A2_{0.5}BO_3$, (FIG. 4C) $AB1_{0.5}B2_{0.5}O_3$, (FIG. 4D) $A1_{0.5}A2_{0.5}B1_{0.5}B2_{0.5}O_3$. The dotted zone represents the target $E_{vac}$, where the materials are anticipated to show superior $CO_2$ conversion capability.
Figure 4B:
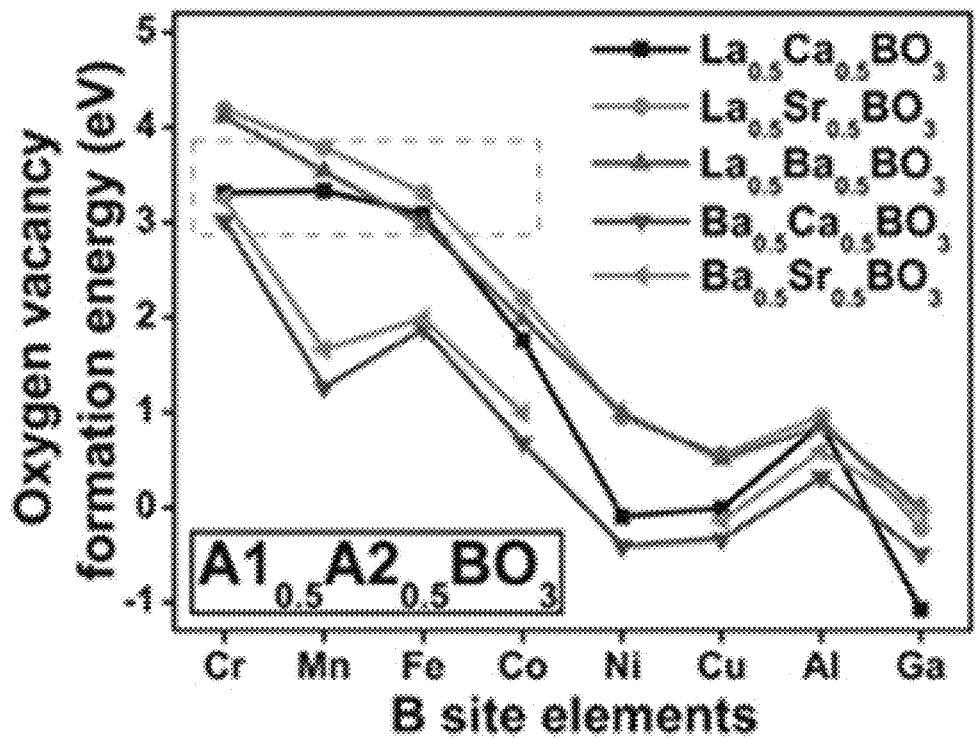
Figure 4C:
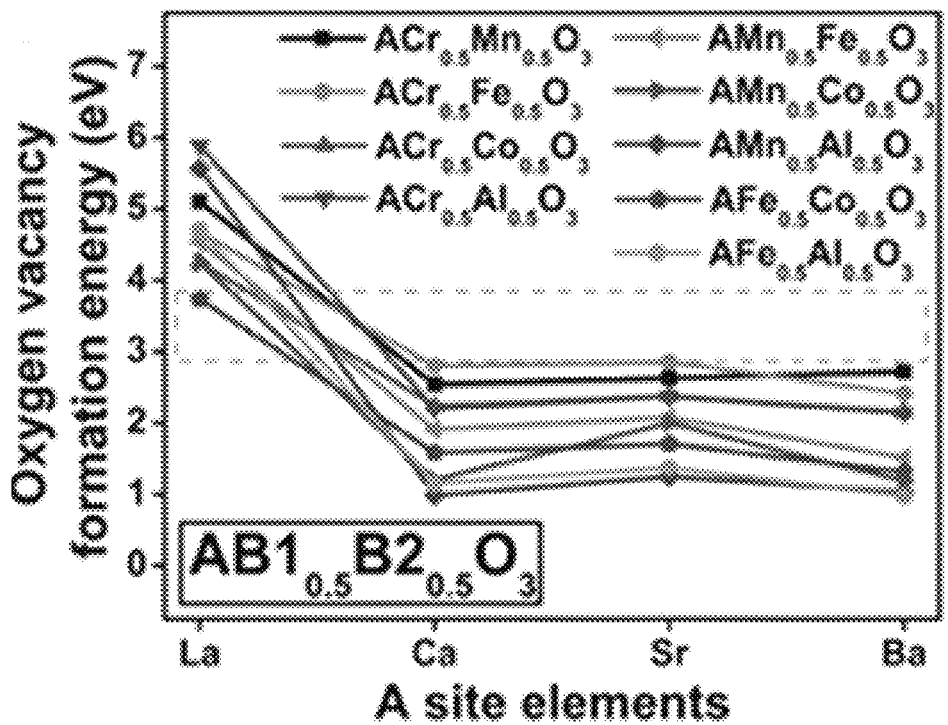
Figure 4D:
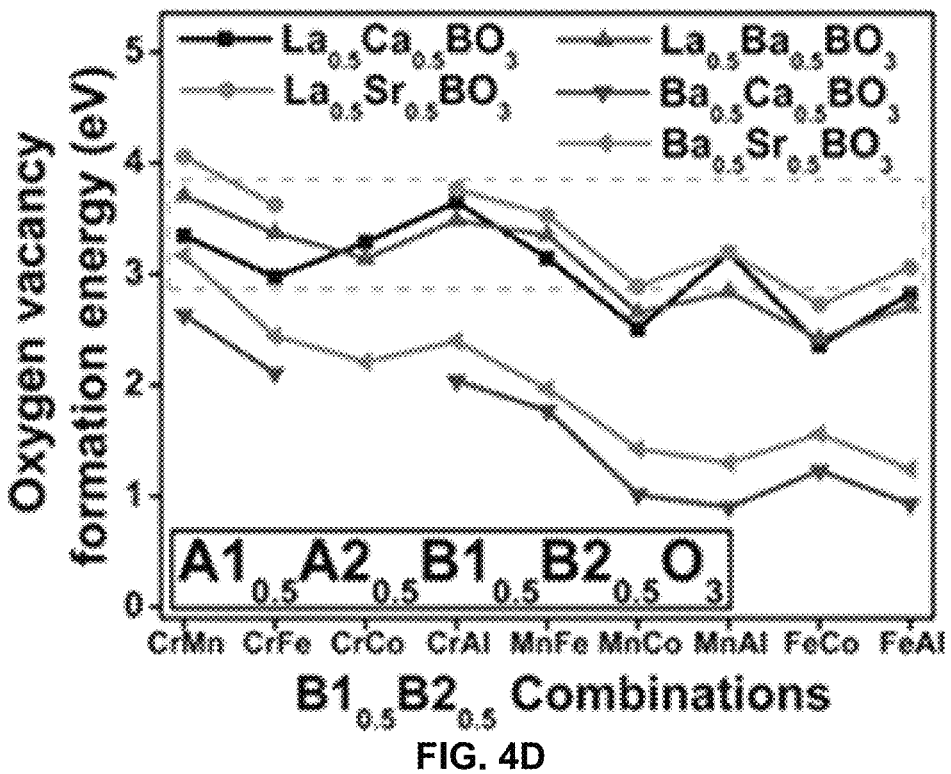

The reverse water gas shift chemical looping (RWGS-CL) process is a two-step process as depicted in FIG. 2. The first step involves the reduction of a mixed metal oxide such as perovskite oxide ($ABO_3$) using hydrogen, whereas the second step involves converting $CO_2$ to CO over these oxygen deficient materials ($ABO_{3-\delta}$). Continuous cycling can allow for large-scale generation of CO which can be further hydrogenated for synthesis of hydrocarbon fuel and its derivatives, thereby closing a synthetic green carbon cycle.

In various aspects, complex perovskite oxides are provided. The perovskite oxides are, in some embodiments, capable of achieving large carbon dioxide conversion rates and with low onset temperatures for carbon monoxide production that are favorable for further downstream processing of CO, in industrial scale. Various catalysts and reactors are provided employing the complex perovskite oxides. Methods of using the perovskite oxides and reactors containing the perovskite oxides are also provided for the thermochemical conversion of carbon dioxide.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Perovskite Oxides and Methods of Making Thereof

In one or more embodiments, a perovskite oxide is provided having a composition according to the formula $A^1_x A^2_{(1-x)} B_1 O_3$, the formula $A_1 B^1_y B^2_{(1-y)} O_3$, or the formula $A^1_x A^2_{(1-x)} B^1_y B^2_{(1-y)} O_3$. In some aspects, x is about 0.2 to 0.8, 0.3 to 0.7, or 0.4 to 0.6. In some aspects, y is about 0.2 to 0.8, 0.3 to 0.7, or 0.4 to 0.6. The elements A, $A^1$, and $A^2$ can be independently selected from the group La, Ca, and Ba, provided that $A^1$ and $A^2$ are not the same. The elements B, $B^1$, and $B^2$ can be independently a transition metal, provided that $B^1$ and $B^2$ are not the same. For example, in some aspects, B, $B^1$, and $B^2$ are independently selected from the group Al, Fe, Mn, Cr, and Co.

The perovskite oxide can have a composition according to the formula $A^1_x A^2_{(1-x)} B_1 O_3$, wherein Al is La. The perovskite oxide can have a composition according to the formula $A_1 B^1_y B^2_{(1-y)} O_3$, wherein Al is La. The perovskite oxide can have a composition according to the formula $A^1_x A^2_{(1-x)} B^1_y B^2_{(1-y)} O_3$, wherein Al is La. The perovskite oxide can have a composition according to the formula $A_1 B^1_y B^2_z B^3_{(1-y-z)} O_3$, wherein Al is La. Particular examples of the perovskite oxide can, in some embodiments, include $La_x Ca_{(1-x)} Mn_y Fe_{(1-y)} O_3$ and $La_x Ba_{(1-x)} Fe_y Al_{(1-y)} O_3$ where $0.25 \leq x \leq 0.75$ and $0.5 \leq y \leq 1.0$. Other particular examples of the perovskite oxide can, in some embodiments, include one or more of $La_{0.6}Ca_{0.4}MnO_3$, $La_{0.6}Ca_{0.4}Fe_{0.4}Mn_{0.6}O_3$, $La_{0.6}Ca_{0.4}Al_{0.4}Mn_{0.6}O_3$, $La_{0.6}Ba_{0.4}Fe_{0.6}Al_{0.4}O_3$, $La_{0.6}Ca_{0.4}Cr_{0.4}Mn_{0.6}O_3$, $La_{0.6}Ca_{0.4}Cr_{0.6}Al_{0.4}O_3$, $La_{0.6}Ca_{0.4}Cr_{0.6}Fe_{0.4}O_3$, $La_{0.6}Ba_{0.4}Mn_{0.6}Fe_{0.4}O_3$, $La_{0.6}Ba_{0.4}MnO_3$, $La_{0.6}Ba_{0.4}Mn_{0.6}Cr_{0.4}O_3$, $La_{0.6}Ba_{0.4}Cr_{0.8}Co_{0.2}O_3$, $La_{0.6}Ca_{0.4}Cr_{0.8}Co_{0.2}O_3$, $La_{0.6}Ba_{0.4}Cr_{0.6}Fe_{0.4}O_3$, $LaCo_{0.33}Fe_{0.33}Mn_{0.33}O_3$, $LaCo_{0.5}Fe_{0.25}Mn_{0.25}O_3$, $LaCo_{0.25}Fe_{0.5}Mn_{0.25}O_3$, and $LaCo_{0.25}Fe_{0.25}Mn_{0.6}O_3$.

The optimization of the oxygen vacancy formation energy can be an important aspect to achieve optimized conversion of $CO_2$ to CO. A material with higher oxygen vacancy formation energy is more reluctant to lose oxygen and may either create fewer oxygen vacancies at a certain temperature, or will require a higher temperature to create the same number of oxygen vacancies. Similarly, a material having lower oxygen vacancy formation energy is more prone to accommodate oxygen vacancies and will be reduced easily during the RWGS-CL process with hesitation to re-oxidize. In some aspects, the perovskite oxides provided herein have an oxygen vacancy formation energy of about 2.5 eV to about 4.0 eV, about 2.86 eV to about 3.86 eV, about 2.9 eV to about 3.9 eV, about 2.9 eV to about 3.4 eV, about 3.4 eV to about 3.9 eV, or about 3.0 eV to about 3.6 eV. In some aspects, the oxygen vacancy formation energy is determined as the enthalpy difference of between the initial stoichiometric material and the final oxygen deficient material along with gas phase oxygen using density functional theory as described herein.

The perovskite oxides can be made by a modified Pechini method. During the process, metal salts or alkoxides are introduced into a citric acid solution with ethylene glycol. Precursors used can include metal nitrates or metal carbonates. Citric acid and ethylene glycol can be used as polymerization or complexation agents for the process. After complete dissolution of the added metal precursors and citric acid, ethylene glycol can be added. The formation of citric complexes is believed to balance the difference in individual behavior of ions in solution, which results in a better distribution of ions and prevents the separation of components at later process stages. The polycondensation of ethylene glycol and citric acid starts at 90° C., resulting in polymer citrate gel formation. When the heating temperature exceeds 400° C., oxidation and pyrolysis of the polymer matrix begin, which lead to the formation of amorphous oxide and/or carbonate precursors. Further heating of this precursor results in the formation of the required material with a high degree of homogeneity and dispersion.

Catalysts and Reactors Including Perovskite Oxides

A variety of catalysts are provided including one or more of the perovskite oxides described herein. The catalyst can include a perovskite oxide described herein, wherein the perovskite oxide has been packed into at least one structure for packing a chemical reactor, wherein the structure is selected from the group of beads, pellets, and fluidized bed powders. The catalyst can include a substrate and a perovskite oxide described herein, for example supported on a surface of the substrate. The substrate can include a monolith having the perovskite oxide deposited on at least a surface of the monolith. Suitable monoliths, in some aspects, include a metal such as platinum, a cordierite, a mullite, silica or a silicon carbide. The monolith can include a Brunauer, Emmet, and Teller (BET) specific surface area of about 5 $m^2/g$ to about 100 $m^2/g$, or about 50 $m^2/g$, 30 $m^2/g$, 10 $m^2/g$ or less. Packed bed reactors are also provided including a catalyst described herein.

The most common materials for monoliths is cordierite (a ceramic material of magnesia, silica, and alumina in the ratio of 2:5:2). Other materials whose monolith structures are commercially available are metals, mullite (mixed oxide of silica and alumina, ratio 2:3) and silicon carbide. These materials have, similar to cordierite, a low Brunauer, Emmet, and Teller (BET) specific surface area (e.g., for cordierite, typically 0.7 $m^2/g$). A low BET surface area in the context of this disclosure is a BET surface area of about 10 $m^2/g$ or less.

Thermochemical Conversion of Carbon Dioxide

Figure 8:
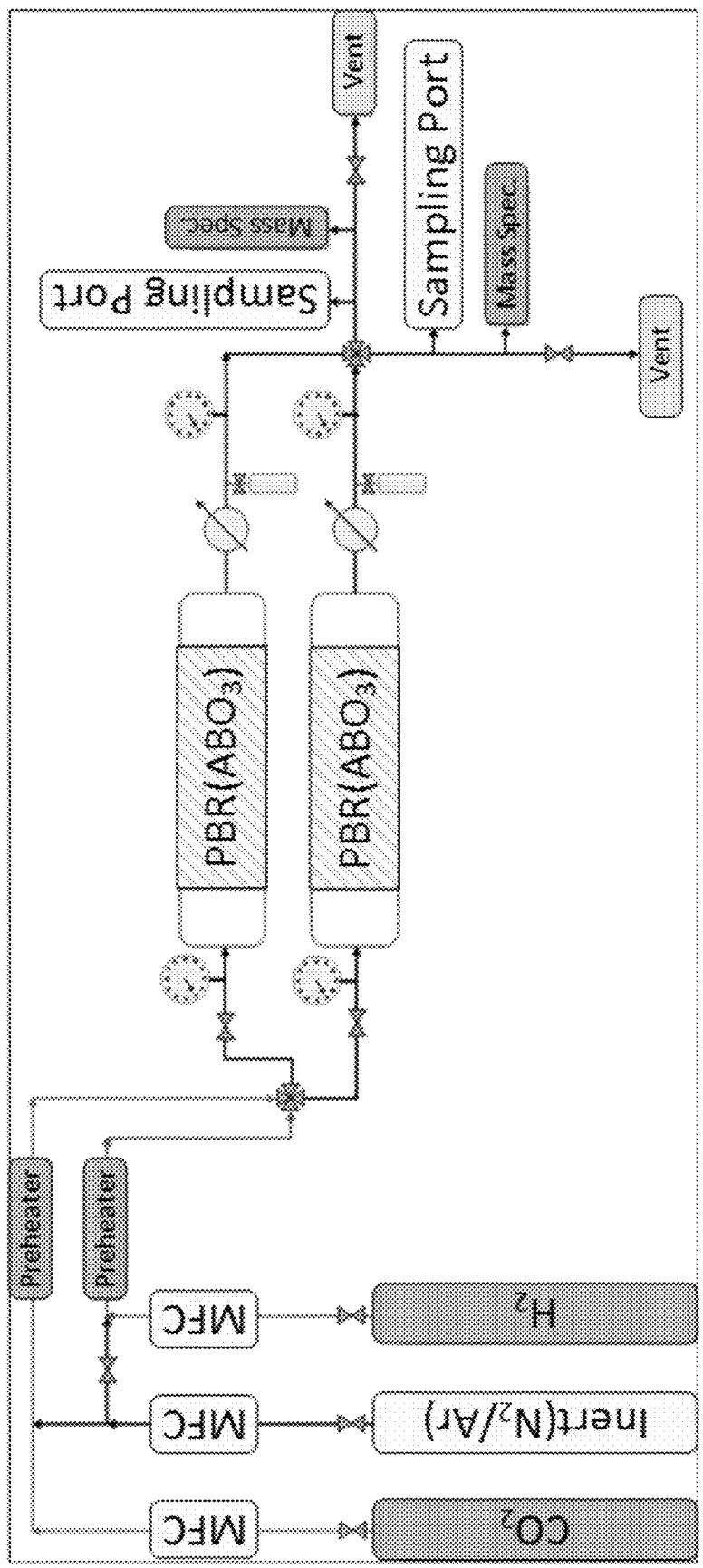
FIG. 8 is a schematic of a possible reverse water gas shift chemical looping (RWGS-CL) module for conversion of $CO_2$ to CO.

The $CO_2$ conversion process via RWGS-CL can be done in a packed bed reactor (PBR) using the perovskite oxides. The perovskite oxides can be pressed to form pellets or can be wash-coated or dip-coated over monoliths. Monoliths are honeycomb shaped materials and used for the three-way catalytic convertor in cars, among other applications. This will allow of more exposed surface area of the perovskites. These perovskite coated monoliths or pellets will thereby be placed in parallel PBRs as shown in the schematic below (FIG. 8). RWGS-CL is a two-step process. Initially the perovskites can be reduced in presence of hydrogen at temperatures of (~500-600° C.) to form oxygen vacant states, subsequent to which these oxygen deficient materials can be oxidized under $CO_2$ flow, so that the $CO_2$ gets converted to CO in the process. As shown in the schematic, each PBR can serve for both reduction and oxidation purposes. Initially hydrogen along with inert gas (nitrogen or argon) will be flown over these materials in a set of PBRs, where these materials will be reduced. Thereafter, by switching the valves, $CO_2$ along with inert gas can be flown over these reduced materials to get the $CO_2$ converted to CO. Multiple reactors placed in parallel can allow for both reduction and oxidation reactions happening in different reactors at the same time so as to have a continuous generation of CO. Further improvement for process efficiencies can be achieved by conducting these reactions in fluidized bed reactors as well instead of PBRs.

Methods of using the perovskite oxides and catalysts described herein are also provided. The methods can be used for the conversion of carbon dioxide to carbon monoxide. In some embodiments, the methods include contacting a perovskite or a catalyst described herein with hydrogen gas at a first elevated temperature to produce an oxygen-deficient perovskite oxide, and contacting the oxygen-deficient perovskite oxide with the carbon dioxide at a second elevated temperature to produce the carbon monoxide. The first elevated temperature can be about 350° C. to 600° C., about 400° C. to 600° C., or about 500° C. to 600° C. The second elevated temperature can be about 400° C. to 800° C. or about 440° C. to 750° C. In some aspects, a low temperature can be used for the second elevated temperature because the perovskite oxides exhibit a low onset temperature. In some aspects, the second elevated temperature is about 440° C. to about 550° C. In some aspects, the carbon monoxide can be produced at a rate of about 140 µmoles $g^{-1}$ $min^{-1}$ to 275 µmoles $g^{-1}$ $min^{-1}$ based upon the mass of the perovskite oxide.

In some aspects, the perovskite oxides and catalysts formed therefrom are capable of producing twice the amount of CO (1242 µmoles/gram perovskite oxide) than that from LSF (599 µmoles/gram perovskite oxide) with CO production rates almost 1.85 times higher than that of LSF (60.5 µmoles/min/gram of LSF). In some aspects, the perovskite oxides are capable of producing CO at yields of about 800 µmoles/gram perovskite oxide to about 1600 µmoles/gram perovskite oxide, about 900 µmoles/gram perovskite oxide to about µmoles/gram perovskite oxide, about 1000 µmoles/gram perovskite oxide to about 1600 µmoles/gram perovskite oxide, about 1100 µmoles/gram perovskite oxide to about 1600 µmoles/gram perovskite oxide, or about 1200 µmoles/gram perovskite oxide to about 1600 µmoles/gram perovskite oxide. In some aspects, the CO production rates are about 80 µmoles/min/gram perovskite oxide to about 200 µmoles/min/gram perovskite oxide, about 100 µmoles/min/gram perovskite oxide to about µmoles/min/gram perovskite oxide, about 100 µmoles/min/gram perovskite oxide to about 180 µmoles/min/gram perovskite oxide, about 120 µmoles/min/gram perovskite oxide to about 180 µmoles/min/gram perovskite oxide, or about 160 µmoles/min/gram perovskite oxide.

In some aspects, the perovskite oxides and catalysts formed therefrom demonstrate improved stability in RWGS-CL cycles. In some aspects, the perovskite oxide or catalysts formed therefrom demonstrate stability over at least 5, at least 10, at least 15, at least 20, or at least 20 RWGS-CL cycles at a temperature of about 500° C. to about 600° C. In some aspects, the perovskite oxide is $La_{0.6}Ca_{0.4}Fe_{0.4}Mn_{0.6}O_3$, or in some aspects the catalyst includes $La_{0.6}Ca_{0.4}Fe_{0.4}Mn_{0.6}O_3$. As demonstrated by the results below, $La_{0.6}Ca_{0.4}Fe_{0.4}Mn_{0.6}O_3$ shows consistent generation of CO over repeated cycles at 550° C. while demonstrating stability throughout these RWGS-CL cycles. The long-term applicability of $La_{0.6}Ca_{0.4}Fe_{0.4}Mn_{0.6}O_3$ is related to its abundance. $La_{0.6}Ca_{0.4}Fe_{0.4}Mn_{0.6}O_3$ presents an earth abundant option with low material and processing costs. This particular perovskite oxide not only demonstrates a stable and consistent high $CO_2$ conversion performance at low temperatures, but is also a sustainable candidate for industrial use.

Examples

Now having described the embodiments of the present disclosure, in general, the following examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Computational Methods

Density functional theory (DFT) based calculations were performed using Vienna ab initio Simulation Package (VASP-5.3.3) (28-32). All the calculations used the plane wave basis set and gradient generalization for the approximation of electron densities. The core electronic states were treated by projector augmented wave (PAW) potentials (33) and Perdew-Burke-Ernzerhof (PBE) (34) variant of exchange correlation. Consistent use of default potentials for all the elements was maintained. Throughout the study, a constant energy cut off of 600 eV was used. The convergence criterion for the ionic relaxations is set at 0.001 eV/atom. All the bulk phase systems studied were cubic, with 40 atoms in a 2×2×2 supercell, while the surface slabs were made of 2×2×2 supercells having 40 atoms with 15 Å of vacuum along the surface direction to mimic the absence of atomic periodicity on surfaces. Convergence with respect to the k point sampling was checked; finally, calculations for all the 40 atom supercell of bulk stoichiometric and non-stoichiometric perovskites were done with 4×4×4 k point mesh generated by an automatic scheme having Monkhorst Pack grid (35). Magnetic effects were not considered explicitly as they are known to have minor effects in the systematic trends of energy (21). For the slab calculations of the surface structures, dipole correction was accounted.

The initial ground state configurations for each of the materials were obtained through a series of varying cell volume calculations. Once the ground state lattice constant was established, the entire set of parameters were used for the nonstoichiometric calculations as well. Though oxygen vacancy formation in a material is a complex process consisting of several steps, the major energy intensive step is the dissociation of the metal-oxygen bond. Hence, computational oxygen vacancy formation energies calculated as enthalpy difference between the initial stoichiometric material and the final oxygen deficient material along with gas phase oxygen mostly represents the energy barrier for the dissociation of the metal-oxygen bonds and the subsequent relaxation of the oxygen deficient structure. The creation of oxygen vacancies is marked by systematic removal of oxygen atoms, either from bulk or surface. The extent of oxygen vacancy (b) was defined as oxygen deficiency per unit molecule of $ABO_3$; thus in a 40 atom supercell of perovskites, $\delta=0.125$ is marked by removal of one oxygen atom. For surface oxygen vacancies of $\delta=0.125$, the number of oxygen atoms removed from the 40 atom supercell is one as well. The oxygen vacancy formation energy is calculated as $$E_{vac} = E_{ABO_{(3-\delta)}} + \delta \times n/2 E_{O_2} - E_{ABO_3} \qquad [1]$$

where, $E_{ABO_3}$ is the total energy of the pure stoichiometric perovskite supercell of n unit cells, while $E_{ABO_{(3-\delta)}}$ is that of the oxygen vacant perovskite supercell, 'n' representing the number of unit cells considered (8 for both bulk and surface calculations) and $E_{O_2}$ is the molecular energy of oxygen. The oxygen over-binding error has been addressed by Wang et al. (36) for PBE functionals by using a correction factor of 1.36 eV. All the calculations of oxygen vacancy formation energy were corrected by this factor. The oxygen adsorption energy on the materials is calculated using $$E_{ads}=E_{P+O_2}-E_{O_2}-E_P \qquad [2]$$

where, $E_P$ is the energy of either pure or oxygen vacant perovskite, $E_{P+O_2}$ is the energy of combined system of $O_2$ adsorbed on the perovskite while $E_{O_2}$ is the energy of molecular gaseous oxygen.

The empirical modelling for the bulk oxygen vacancy formation energy has been done with respect to two intrinsic parameters for the materials that closely govern oxygen vacancy formation. Enthalpy of formation is a measure of stability of a material. It has been calculated based on the difference of the pure phase enthalpy of a material and the enthalpy of its pure phase elemental components. Bond dissociation energy is closely related to vacancy formation energy. The bond dissociation energy is approximately calculated as per the total energy to break two 'B—O' bonds and four 'A-O' bonds in a perovskite cubic structure. The data from the handbook of chemical bond energies(37) were used for the purpose of estimating the bond dissociation energy associated with an oxygen vacancy formation.

Experimental Methods

Perovskite samples of the form, $A^1_{(1-x)}A^2_xB^1_{(1-y)}B^2_yO_3$, were synthesized by the Pechini method. Metal nitrate/carbonate precursors were dissolved in a citric acid solution combined with ethylene glycol to form a sol-gel. The gel was charred at 450° C., crushed, and then further calcined at 950° C. to obtain fresh samples of stoichiometric perovskite oxides.

Crystalline structures were analyzed using X-Ray Diffraction (XRD) in a Bruker X-ray diffractometer with a Cu Kα source. The resulting diffraction patterns collected from 20 to 100 (2θ°) with a step size of 0.0102 2θ° confirmed the presence of a dominant perovskite oxide phase in each sample.

Oxygen vacancy formation under hydrogen (10% $H_2$/He) was measured by temperature-programmed reduction (TPR) from ambient temperature to 950° C. Temperature programmed oxidation (TPO) experiments were conducted to detect the conversion of $CO_2$ to CO. After isothermal reduction for 30 minutes at 550° C., they were cooled naturally under He flow and subsequently heated back to 950° C. under $CO_2$ flow (10% $CO_2$/He) for generation of CO. All the temperature programmed experiments were conducted in a quartz U-tube reactor placed within a tube furnace. 99.99% pure gases were flown through the reactor with the flowrate controlled by Alicat mass flow controllers. A MKS Cirrus mass spectrometer was used to monitor the temperature programmed reactions.

Discussion

In these examples, the $E_{vac}$ was examined for a number of materials leading to identifying materials that can convert $CO_2$ to CO. For simplicity, the different perovskite oxide compositions were classified into the four major types: $ABO_3$ (presence of a single element 'A' and another element B throughout the material), $A^1_{0.5}A^2_{0.5}BO_3$ (presence of two elements $A^1$ and $A^2$ in equal compositions at the 'A' site), $AB^1_{0.5}B^2_{0.5}O_3$ (presence of two elements $B^1$ and $B^2$ in equal compositions at the 'B' site), and $A^1_{0.5}A^2_{0.5}B^1_{0.5}B^2_{0.5}O_3$ (presence of two elements A1 and A2 at the 'A' site and two elements B1 and B2 at the 'B' site). For the 'A' site, the elements included lanthanum, calcium, strontium and barium while for 'B' site the elements included the 3d elements from chromium to copper (Cr, Mn, Fe, Co, Ni and Cu) along with aluminum and gallium on the basis of several previous reports of successful thermochemical (TC) and RWGS-CL processes (12, 13, 22, 23).

Figure 5A:
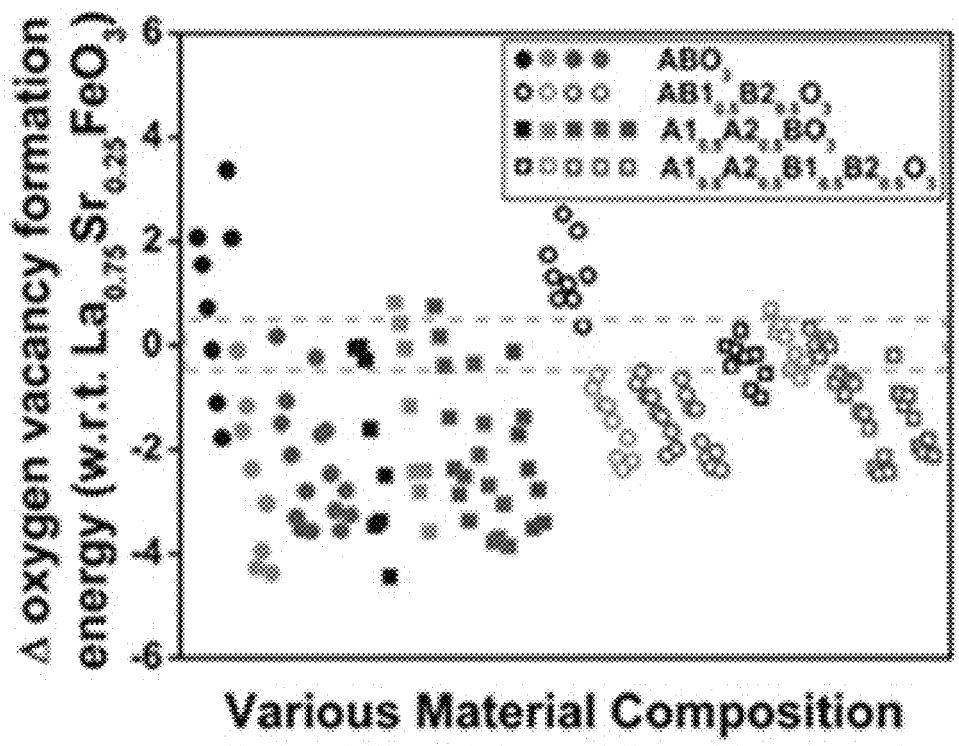
FIGS. 5A-5F graph the prediction and validation of earth abundant perovskite oxides with $CO_2$ conversion capabilities.
Figure 5B:
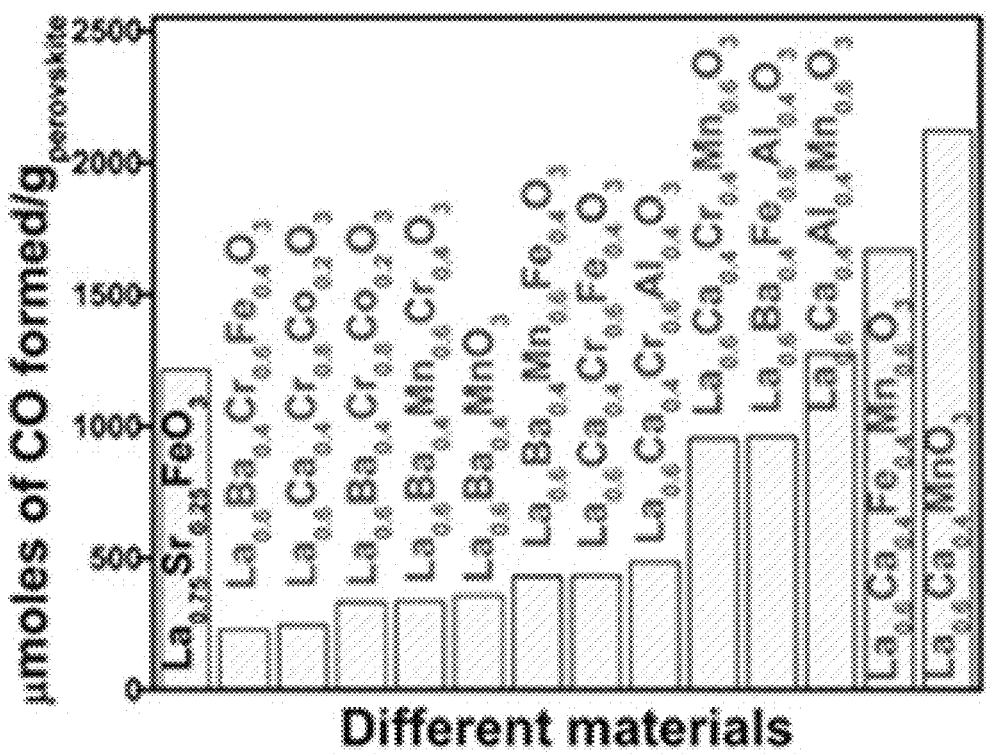
Figure 5C:
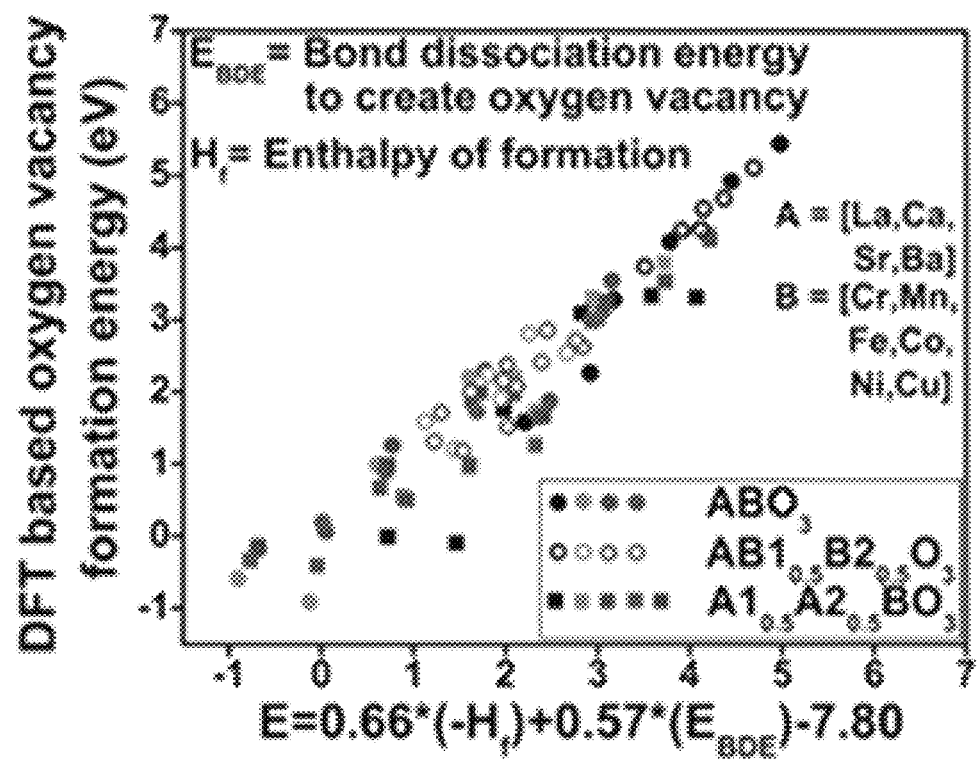
Figure 5D:
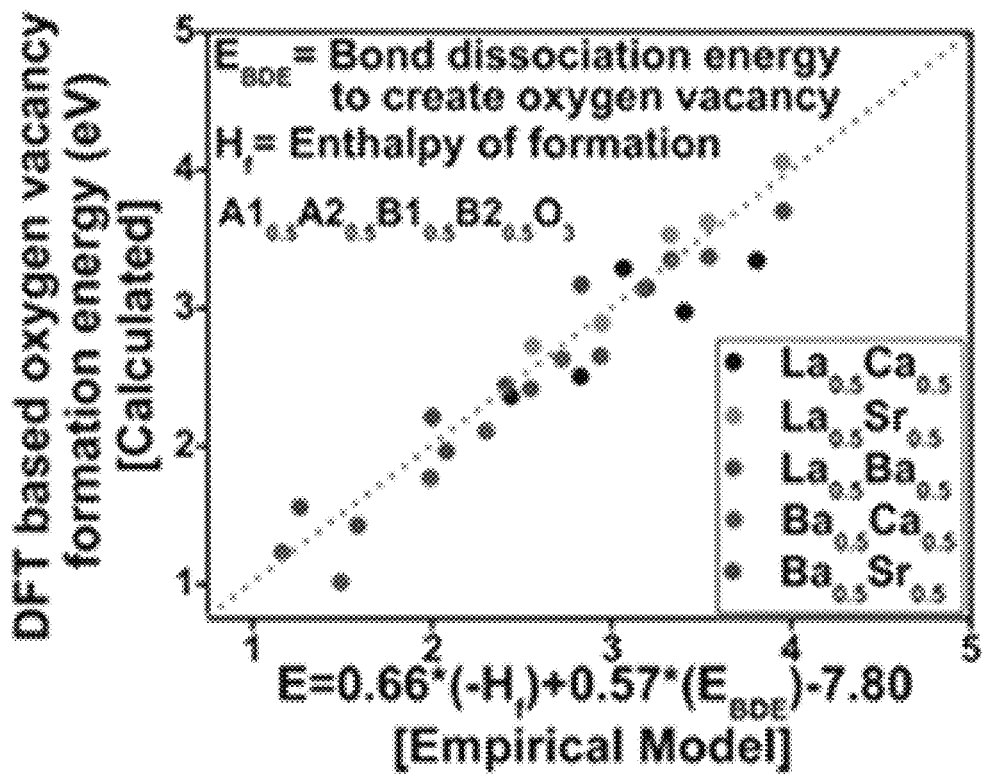
Figure 5E:
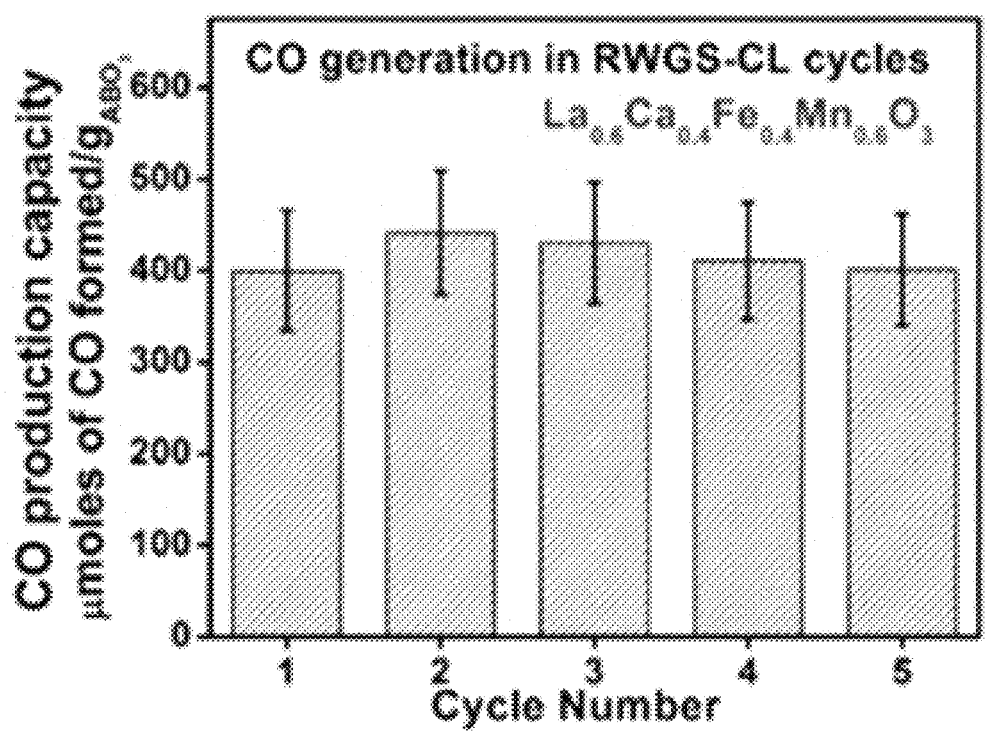
Figure 5F:
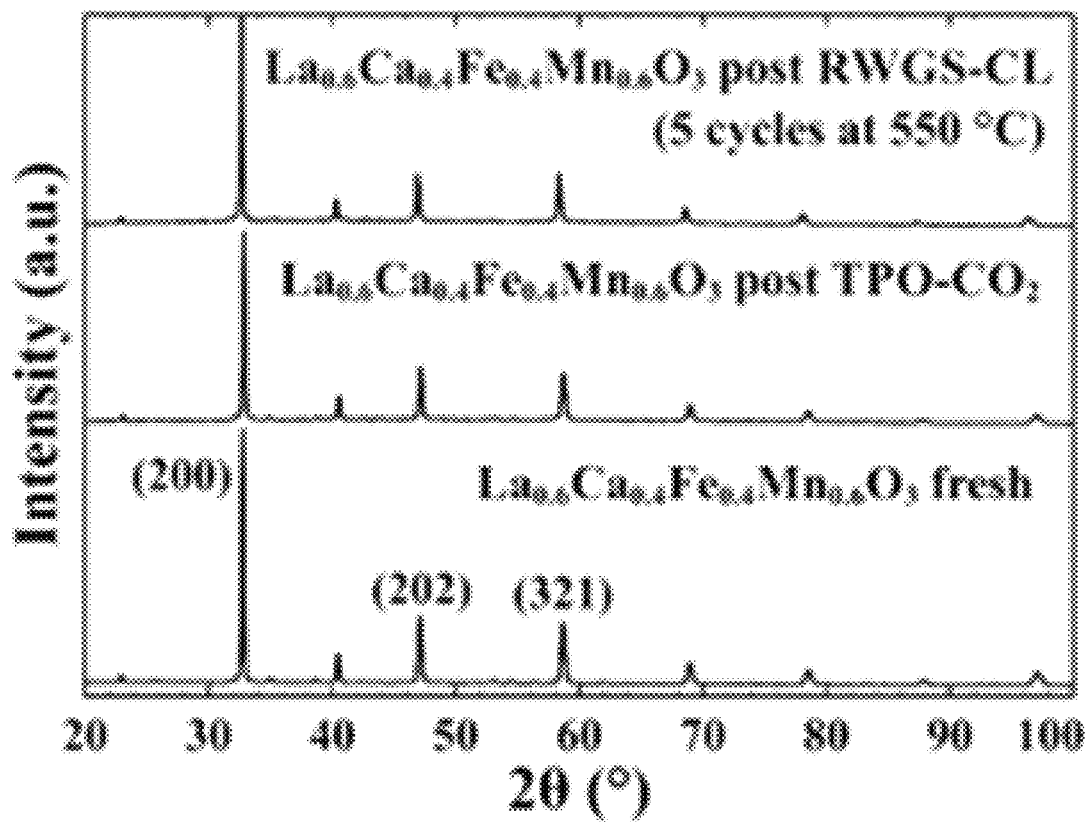
Figure 6:
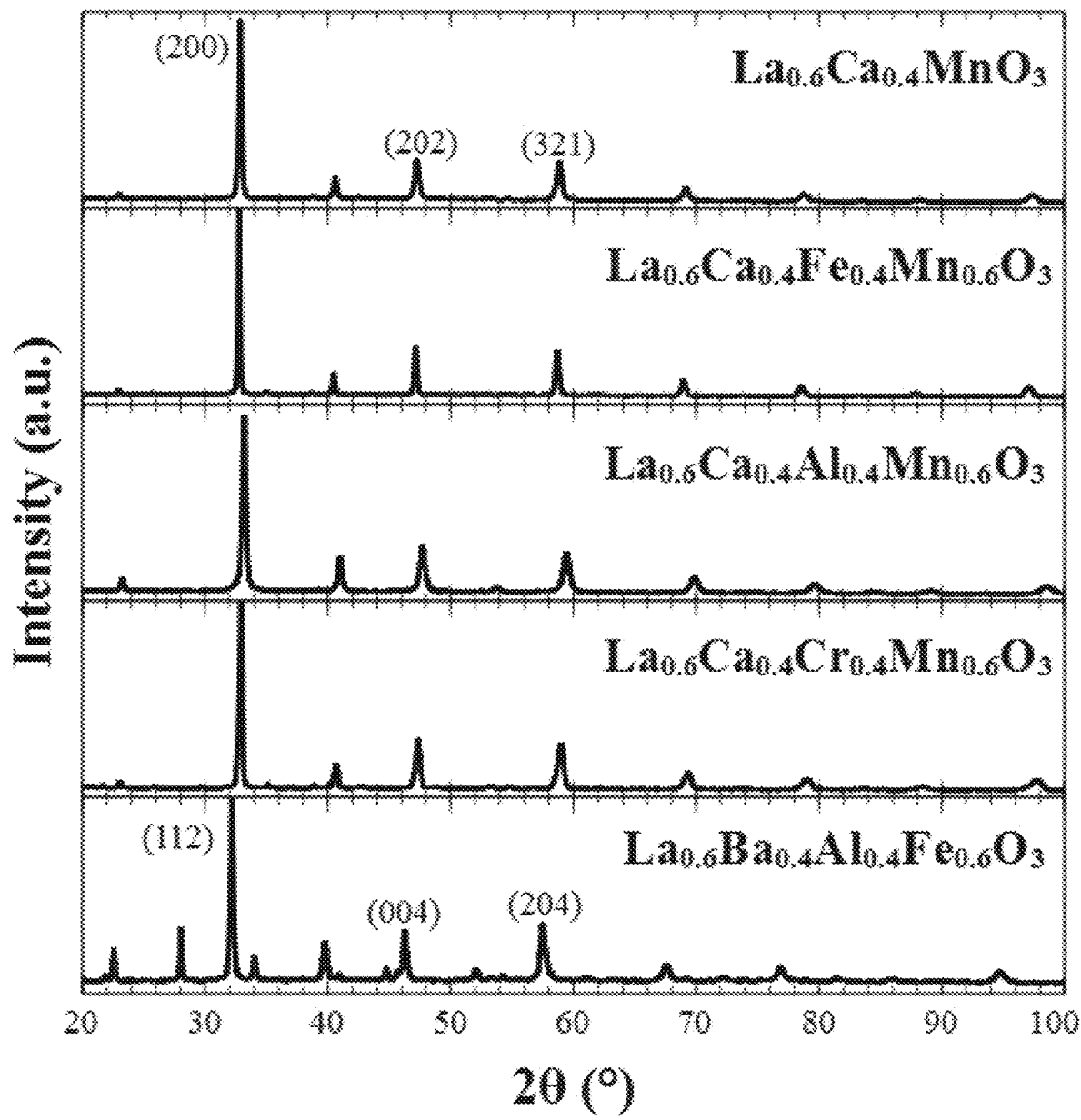
FIG. 6 is a graph of the XRDs of samples that exhibited high total CO yields in RWGS-CL process for $CO_2$ conversion, each of which demonstrated a dominant perovskite crystalline structure with orthorhombic geometry (Reference code: 00-046-0513, space group: Pnma). In particular, $La_{0.6}Ca_{0.4}MnO_3$, $La_{0.6}Ca_{0.4}Fe_{0.4}Mn_{0.6}O_3$, and $La_{0.6}Ca_{0.4}Al_{0.4}Mn_{0.6}O_3$ each exhibited higher CO yields than $La_{0.75}Sr_{0.25}FeO_3$. Slight rightward shifts of major $La_{0.6}Ca_{0.4}MnO_3$ diffraction lines suggest successful incorporation of additional 'B' site elements without notable formation of secondary oxide phases.
Figure 7A:
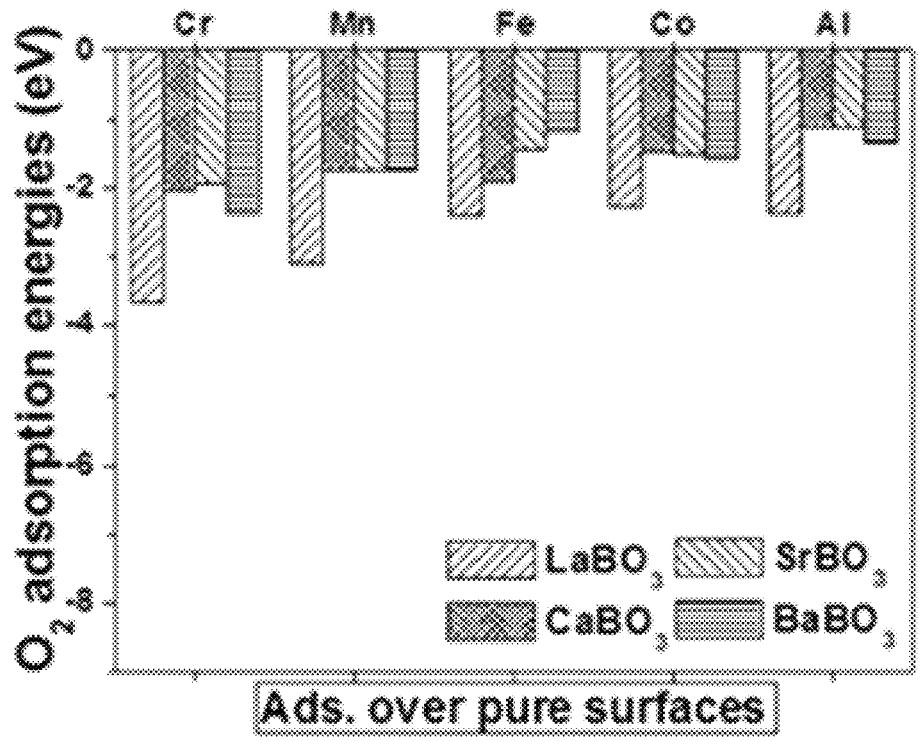
FIGS. 7A-7F are bar graphs depicting oxygen adsorption energies ($E_{ads}$) over (100) crystal facets of $LaBO_3$, $CaBO_3$, $SrBO_3$ and $BaBO_3$ [B=Cr, Mn, Fe, Co and Al].
Figure 7B:
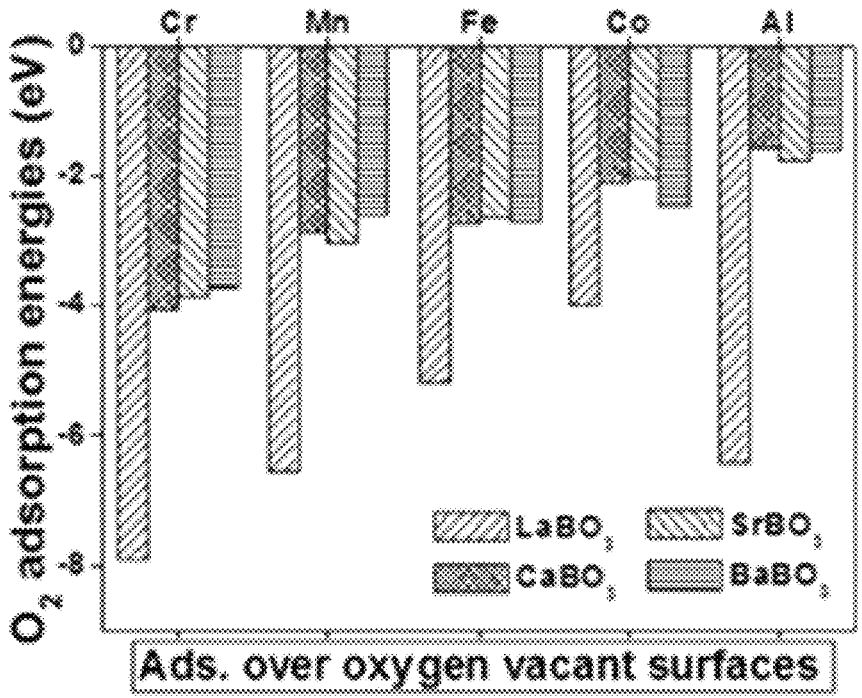
Figure 7C:
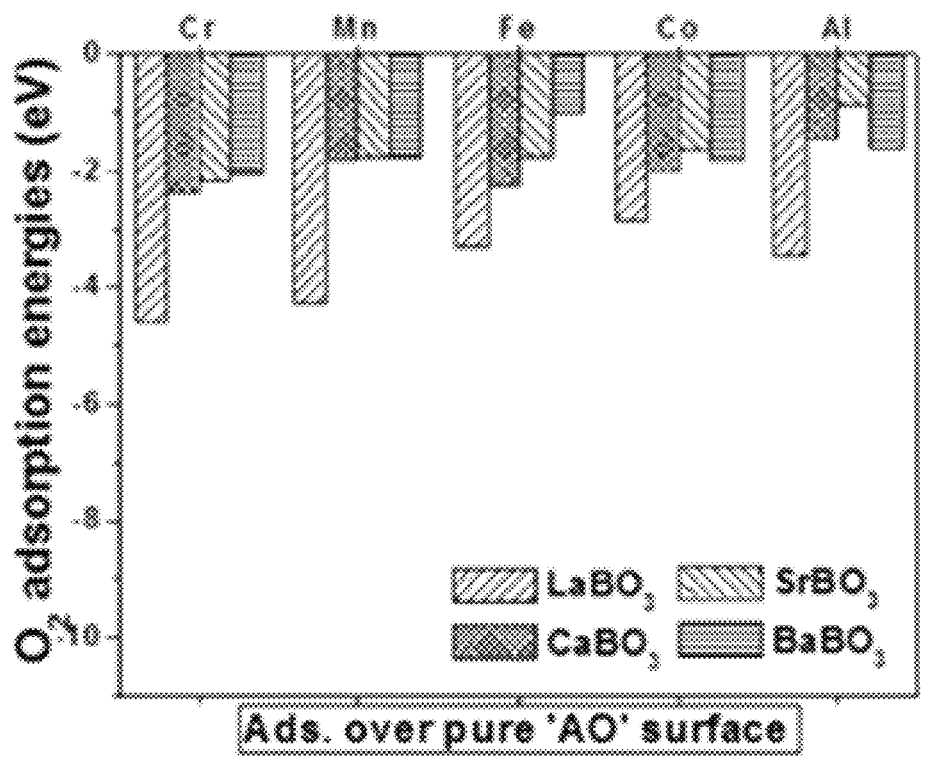
Figure 7D:
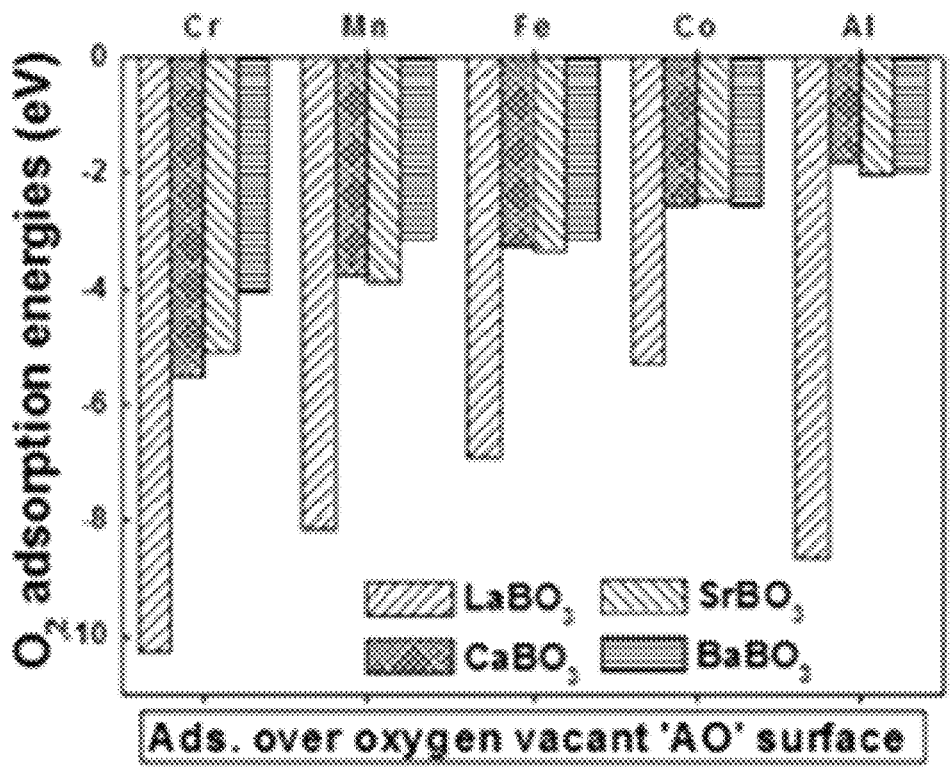
Figure 7E:
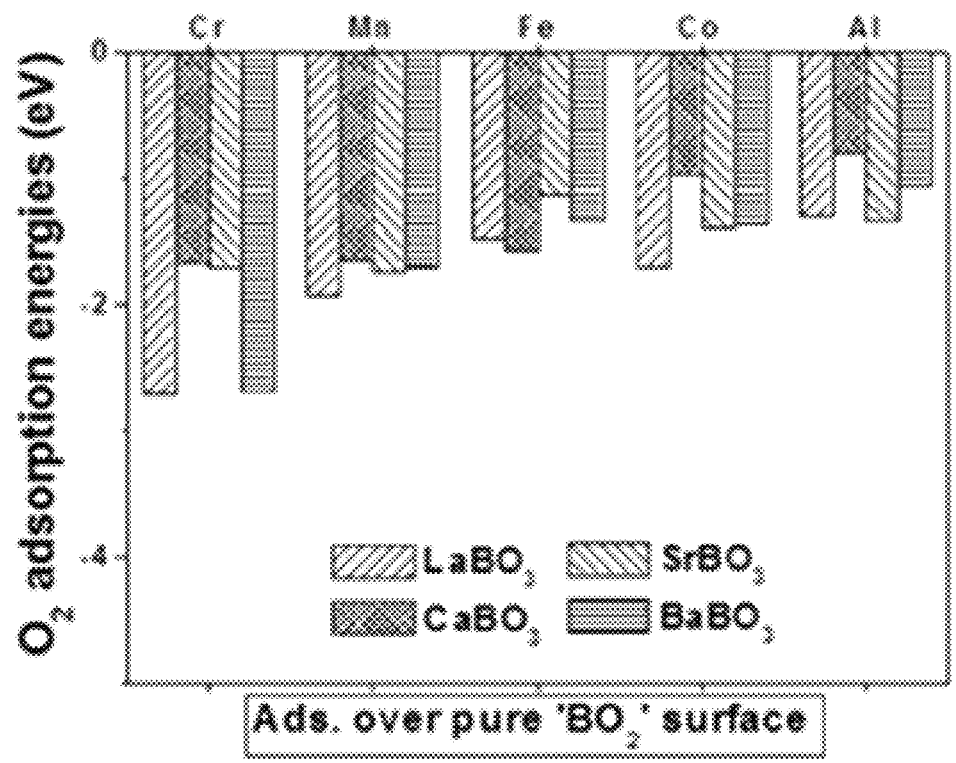
Figure 7F:
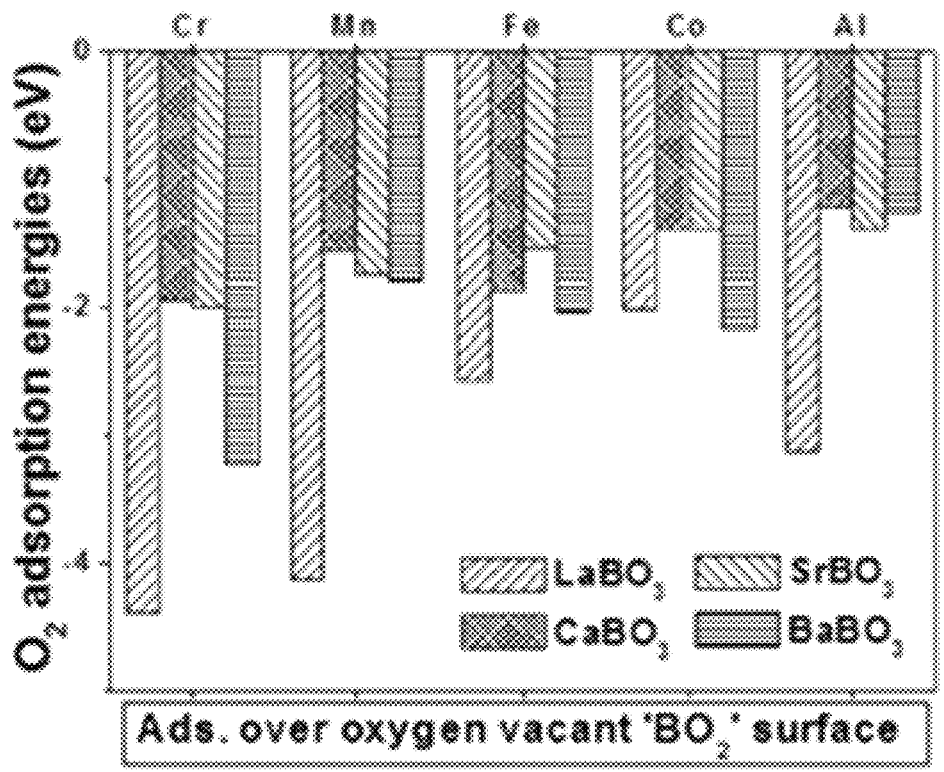

The relaxed crystal structures of these four types of perovskite oxides are shown in FIGS. 3A-3D. $E_{vac}$ in these materials vary over a large range from about −1 eV to 7 eV as shown in FIGS. 4A-4D (negative values of $E_{vac}$ reflecting disintegration of the perovskites upon oxygen vacancy creation). The decreasing trend of $E_{vac}$ along the 3d elements agrees with literature (21). To-date, $La_{0.75}Sr_{0.25}FeO_3$ ($E_{vac}$ of 3.36 eV) has been successful in converting $CO_2$ to CO at a low temperature of 550° C. It is expected that any material having similar $E_{vac}$ of about 3.36 eV is anticipated to exhibit similar oxygen vacancy creation characteristics. For materials, the examples focused on those having $E_{vac}$ of (3.36±0.5) eV as shown by the dotted box in FIGS. 4A-4D. The difference of $E_{vac}$ of all the screened materials from that of the current best candidate $La_{0.75}Sr_{0.25}FeO_3$ is plotted in FIG. 5A. Large positive deviations indicate difficulty of oxygen vacancy formation, whereas, large negative values indicate propensity towards instability and decomposition of the material. Materials exhibiting $E_{vac}$ values within ±0.5 eV were chosen for synthesis and reactor testing. FIG. 5A illustrates that a number of materials and compositions fit this criterion. Several of these materials were synthesized by the Pechini method (24) (XRD patterns shown in FIG. 6) and subsequently tested for $CO_2$ conversion capabilities. All of these materials were found to successfully convert $CO_2$, while the earth abundant lanthanum-calcium based perovskites revealed much improved performance (CO yield of $La_{0.6}Ca_{0.4}MnO_3$ is about 1.75 times higher than the current best material $La_{0.75}Sr_{0.25}FeO_3$; while the CO formation rate for $La_{0.6}Ca_{0.4}Fe_{0.4}Mn_{0.6}O_3$ is almost 2.24 times than that of $La_{0.75}Sr_{0.25}FeO_3$). Yields for the various materials tested are shown in FIG. 5B. The $CO_2$ conversion performance of these materials is reported in detail in Table 1. The onset of $CO_2$ conversion on most of these materials happens around 500° C. FIG. 5E shows consistent generation of CO by $La_{0.6}Ca_{0.4}Fe_{0.4}Mn_{0.6}O_3$ over repeated cycles at 550° C. while FIG. 5F explicitly shows the stability of $La_{0.6}Ca_{0.4}Fe_{0.4}Mn_{0.6}O_3$ structure throughout these RWGS-CL cycles. The long-term applicability of these perovskite materials is related to their abundance. The relative earth abundance of the 'A' and 'B' site composition of these perovskite oxides shows easy availability of several of the predicted materials.[50] $La_{0.6}Ca_{0.4}Fe_{0.4}Mn_{0.6}O_3$ presents an earth abundant option with low material and processing costs. This particular perovskite oxide not only demonstrates a stable and consistent high $CO_2$ conversion performance at low temperatures, but is also a sustainable candidate for industrial use.

TABLE 1

CO$_2$ conversion rates and yield in the RWGS-CL process using perovskite oxides.

| Material | CO yield (µmoles/g cat) | Maximum CO production rate (µmoles/g cat/min) [corresponding temperature(° C.)] | CO production onset temperature (° C.) | % CO$_2$ conversion* |
|---|---|---|---|---|
| La$_{0.75}$Sr$_{0.25}$FeO$_3$ | 599 | 60.5 [560] | 450 | 2.02 |
| La$_{0.6}$Ca$_{0.4}$MnO$_3$ | 1242 | 113 [710] | 585 | 1.82 |
| La$_{0.6}$Ca$_{0.4}$Fe$_{0.4}$Mn$_{0.6}$O$_3$ | 973 | 160 [500] | 450 | 2.40 |
| La$_{0.6}$Ca$_{0.4}$Al$_{0.4}$Mn$_{0.6}$O$_3$ | 757 | 38.0 [640] | 550 | 0.88 |
| La$_{0.6}$Ba$_{0.4}$Fe$_{0.6}$Al$_{0.4}$O$_3$ | 569 | 77.4 [550] | 440 | 1.22 |
| La$_{0.6}$Ca$_{0.4}$Cr$_{0.4}$Mn$_{0.6}$O$_3$ | 566 | 18.3 [680] | 450 | 0.42 |
| La$_{0.6}$Ca$_{0.4}$Cr$_{0.6}$Al$_{0.4}$O$_3$ | 288 | 10.0 [750] | 535 | 0.23 |
| La$_{0.6}$Ca$_{0.4}$Cr$_{0.6}$Fe$_{0.4}$O$_3$ | 257 | 6.70 [860] | 500 | 0.14 |
| La$_{0.6}$Ba$_{0.4}$Mn$_{0.6}$Fe$_{0.4}$O$_3$ | 254 | 11.4 [860] | 650 | 0.15 |
| La$_{0.6}$Ba$_{0.4}$MnO$_3$ | 210 | 16.1 [640] | 580 | 0.33 |
| La$_{0.6}$Ba$_{0.4}$Mn$_{0.6}$Cr$_{0.4}$O$_3$ | 198 | 18.5 [610] | 535 | 0.37 |
| La$_{0.6}$Ba$_{0.4}$Cr$_{0.8}$Co$_{0.2}$O$_3$ | 196 | 8.60 [630] | 525 | 0.31 |
| La$_{0.6}$Ca$_{0.4}$Cr$_{0.8}$Co$_{0.2}$O$_3$ | 146 | 9.80 [690] | 560 | 0.22 |
| La$_{0.6}$Ba$_{0.4}$Cr$_{0.6}$Fe$_{0.4}$O$_3$ | 135 | 8.50 [560] | 470 | 0.18 |

TABLE 2

Comparison of CO$_2$ conversion performance by various catalysts by various methods at different operational temperatures.

| Material | Method | Temp (° C.) | Rates (µmoles/gcat/min) |
|---|---|---|---|
| TiO$_2$(P25)* | Photocatalysis | 5 | 0.006 |
| Pt—Ti_Y_Zeolite* | Photocatalysis | 55 | 0.00133 |
| Ru/RuO$_x$/TiO$_2$* | Photocatalysis | 46 | 0.817 |
| Cu ZnO* | Photocatalysis | 32-40 | 0.0005 |
| Co$_3$O$_4$/CeO$_2$** | Photocatalysis | RT | 0.1045 |
| Ceria*** | Thermochemical | 1500/900 | 206 (peak) 81 (avg) |
| Sr$_{0.6}$La$_{0.4}$Mn$_{0.6}$Al$_{0.4}$O$_3$† | Thermochemical | 1350/1000 | 9.3 |
| Sr$_{0.4}$La$_{0.6}$Mn$_{0.4}$Al$_{0.6}$O$_3$† | Thermochemical | 1350/1000 | 18.4 |
| Sr$_{0.4}$La$_{0.6}$Mn$_{0.6}$Al$_{0.4}$O$_3$† | Thermochemical | 1350/1000 | 21.9 |
| Ce$_{0.67}$Fe$_{2.33}$O$_4$†† | Thermochemical | 1400/1100 | 0.5 |
| Ni-Ferrite††† | Thermochemical | 1100 | 22 |
| Rh/TiO$_2$‡ | RWGS | 300 | 56.0 |
| Commercial Cu/ZnO/Al$_2$O$_3$‡‡ | RWGS | 250 | 258.6 |
| Ce$_{0.2}$Fe$_{0.8}$O$_2$‡‡‡ | RWGS-CL | 750/600 | 210 |
| Fe$_2$O$_3$:Al$_2$O$_3$ (Fe:Al = 7:3)§ | RWGS-CL | 750 | 440 |
| Fe$_2$O$_3$:Al$_2$O$_3$ (Fe:Al = 9:1)§ | RWGS-CL | 750 | 350 |
| Fe$_3$O$_4$ Ce$_{0.5}$Zr$_{0.5}$O$_2$§§ | RWGS-CL | 800 | 22.22 |
| La$_{0.75}$Sr$_{0.25}$CoO$_3$§§§ | RWGS-CL | 500/850 | 100.8 |
| La$_{0.75}$Sr$_{0.25}$FeO$_3$$^\alpha$ | RWGS-CL | 550 | 80 |

*Y. Izumi, Coordination Chemistry Reviews, 2013, 257, 171-186.
**Y. Huang, C.-F. Yan, C.-Q. Guo and S.-L. Huang, International Journal of Photoenergy, 2015, 2015, 11.
***W. C. Chueh, C. Falter, M. Abbott, D. Scipio, P. Furler, S. M. Haile and A. Steinfeld, Science, 2010, 330, 1797-1801.
†A. H. McDaniel, E. C. Miller, D. Arifin, A. Ambrosini, E. N. Coker, R. O'Hayre, W. C. Chueh and J. Tong, Energy & Environmental Science, 2013, 6, 2024-2028.
††J. E. Miller, M. D. Allendorf, R. B. Diver, L. R. Evans, N. P. Siegel and J. N. Stuecker, Journal of Materials Science, 2008, 43, 4714-4728.
†††S. Lorentzou, G. Karagiannakis, C. Pagkoura, A. Zygogianni and A. G. Konstandopoulos, Energy Procedia, 2014, 49, 1999-2008.
‡T. Inoue, T. Tizuka and K. Tanabe, Applied Catalysis, 1989, 46, 1-9.
‡‡M. J. L. Ginés, A. J. Marchi and C. R. Apesteguia, Applied Catalysis A: General, 1997, 154, 155-171.
‡‡‡V. V. Galvita, H. Poelman, V. Bliznuk, C. Detavernier and G. B. Marin, Industrial & Engineering Chemistry Research, 2013, 52, 8416-8426.
§L. K. Rihko-Struckmann, P. Datta, M. Wenzel, K. Sundmacher, N. V. R. A. Dharanipragada, H. Poelman, V. V. Galvita and G. B. Marin, Energy Technology, 2016, 4, 304-313.
§§M. Wenzel, N. V. R. Aditya Dharanipragada, V. V. Galvita, H. Poelman, G. B. Marin, L. Rihko-Struckmann and K. Sundmacher, Journal of CO2 Utilization, 2017, 17, 60-68.
§§§Y. A. Daza, R. A. Kent, M. M. Yung and J. N. Kuhn, Industrial & Engineering Chemistry Research, 2014, 53, 5828-5837.
$^\alpha$Y. A. Daza, D. Maiti, R. A. Kent, V. R. Bhethanabotla and J. N. Kuhn, Catalysis Today, 2015, 258, 2, 691-698.

The table enlists the CO production rates and yields by the perovskite oxides. The notable aspect of these perovskite oxides is that even if the peak CO formation rates for some of the oxides may happen at a higher temperature, the onset temperature is mostly between 450° C.-600° C.

Empirical modelling of these DFT-predicted $E_{vac}$ values was performed to: (i) unravel the close intrinsic material property dependence of $E_{vac}$ and (ii) to screen similar materials with less computational effort. Oxygen vacancy formation in a lattice comprises of breaking of 'A-O' and 'B—O' bonds associated with the lattice oxygen being removed and the subsequent relaxation of the oxygen deficient material. Bond dissociation energies provide insights into the energy requirement for 'A-O' and 'B—O' bond cleavage, while the enthalpy of formation of a material correlates with the stability of the material. Hence, solely based on these simple parameters an empirical model (FIG. 5C) is fitted to the computed $E_{vac}$ values for ABO$_3$, Al$_{0.5}$A2$_{0.5}$BO$_3$, and AB1$_{0.5}$B2$_{0.5}$O$_3$. The model was then utilized to predict $E_{vac}$ of Al$_{0.5}$A2$_{0.5}$B1$_{0.5}$B2$_{0.5}$O$_3$ and was found closely matching the DFT-calculated data (FIG. 5D). This empirical model is expected to be applicable to perovskite oxides with any combination of 'A' site elements like La, Ca, Sr, Ba and the 'B' site elements having transition metal atoms. It is of prime interest to have earth abundant materials to guarantee the long term sustainability of the RWGS-CL process. A relative earth abundance of the 'A' and 'B' site elemental composition of these perovskite oxides reveals the easy availability of many of our predicted materials(25).

Figures 9A, 9B, 9C, 9D, 9E, 9F, 9G, 9H, 9I, 9J, 9K, 9L:
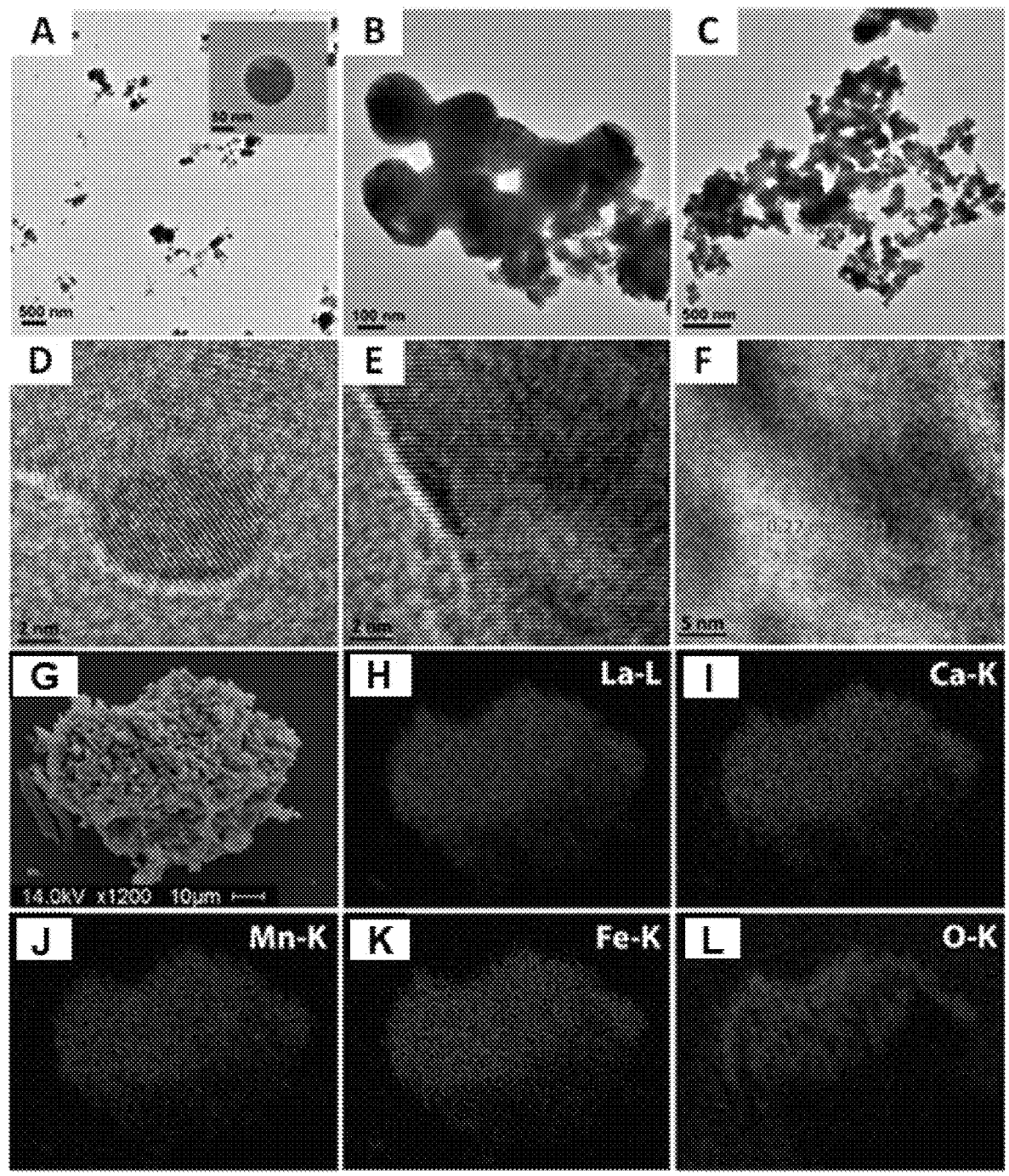
FIGS. 9A-9L show electron micrographs of perovskite oxides and elemental maps via EDS.

Oxygen adsorption energies ($E_{ads}$) were computed on the pure stoichiometric and oxygen vacant (100) surfaces of ABO$_3$ perovskite oxides to gain insights into the reaction mechanisms. The two dominant crystal facet terminations are 'AO' (having only 'A' site atoms and oxygen) and 'BO$_2$' (having only 'B' site atoms and oxygen). Oxygen adsorption energies have been directly related to CO$_2$ conversion(13). FIGS. 7A-7F show that $E_{ads}$ is significantly larger on oxygen vacant surfaces irrespective of composition of the surface, proving the necessity of oxygen vacancies for better CO$_2$ reduction reactions. 'AO' facets are more favorable for CO$_2$ conversion than the 'BO' facets. Synthesis techniques which target AO facets are indicated for improved CO$_2$ conversion performance. $E_{ads}$ trends across the 'B' site transition metals is similar to that of $E_{vac}$ trends. This establishes $E_{vac}$ as an appropriate descriptor not only for the oxygen vacancy creation step for RWGS-CL, but for the entire RWGS-CL process as a whole. The better performing materials were further investigated via transmission electron microscopy (TEM), scanning electron microscopy (SEM), energy-dispersive x-ray spectroscopy (EDS) and x-ray photoelectron spectroscopy (XPS). FIGS. 9A-9C reveal the TEM micrographs of $La_{0.75}Sr_{0.25}FeO_3$, $La_{0.6}Ca_{0.4}MnO_3$ and $La_{0.6}Ca_{0.4}Fe_{0.4}Mn_{0.6}O_3$ samples at pre-reaction conditions. The samples show nanoparticle formation in approximately 100-250 nm size range. Fine nanospheres are also found in LSF samples (inset of FIG. 9A). HRTEM images reveal the d-spacing of the representative peaks of the perovskite crystals. No other crystalline phase was detected, in accord with XRD results. Presence of constituent elements in the porous agglomerate of $La_{0.6}Ca_{0.4}Fe_{0.4}Mn_{0.6}O_3$ sample (FIG. 9G) is shown in FIGS. 9H-9L. A homogeneous bulk phase is observed with no elemental segregation. The SEM images of $La_{0.75}Sr_{0.25}FeO_3$, $La_{0.6}Ca_{0.4}MnO_3$ and $La_{0.6}Ca_{0.4}Fe_{0.4}Mn_{0.6}O_3$ samples at their pre and post-reaction conditions are shown in FIGS. 15A-15F.

Figures 10A, 10B:
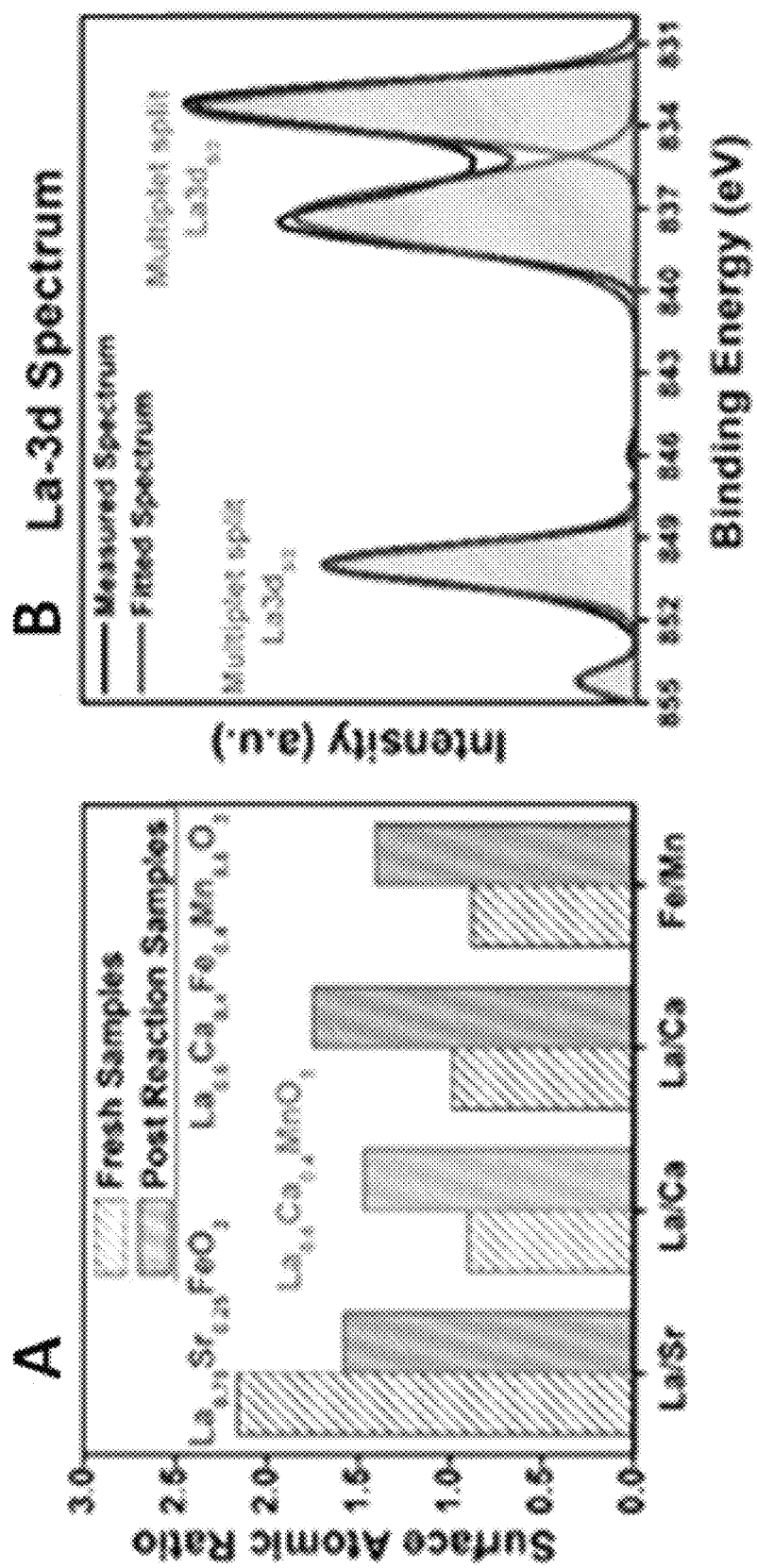
FIGS. 10A-10F show XPS results for perovskite oxide samples.
Figures 10C, 10D:
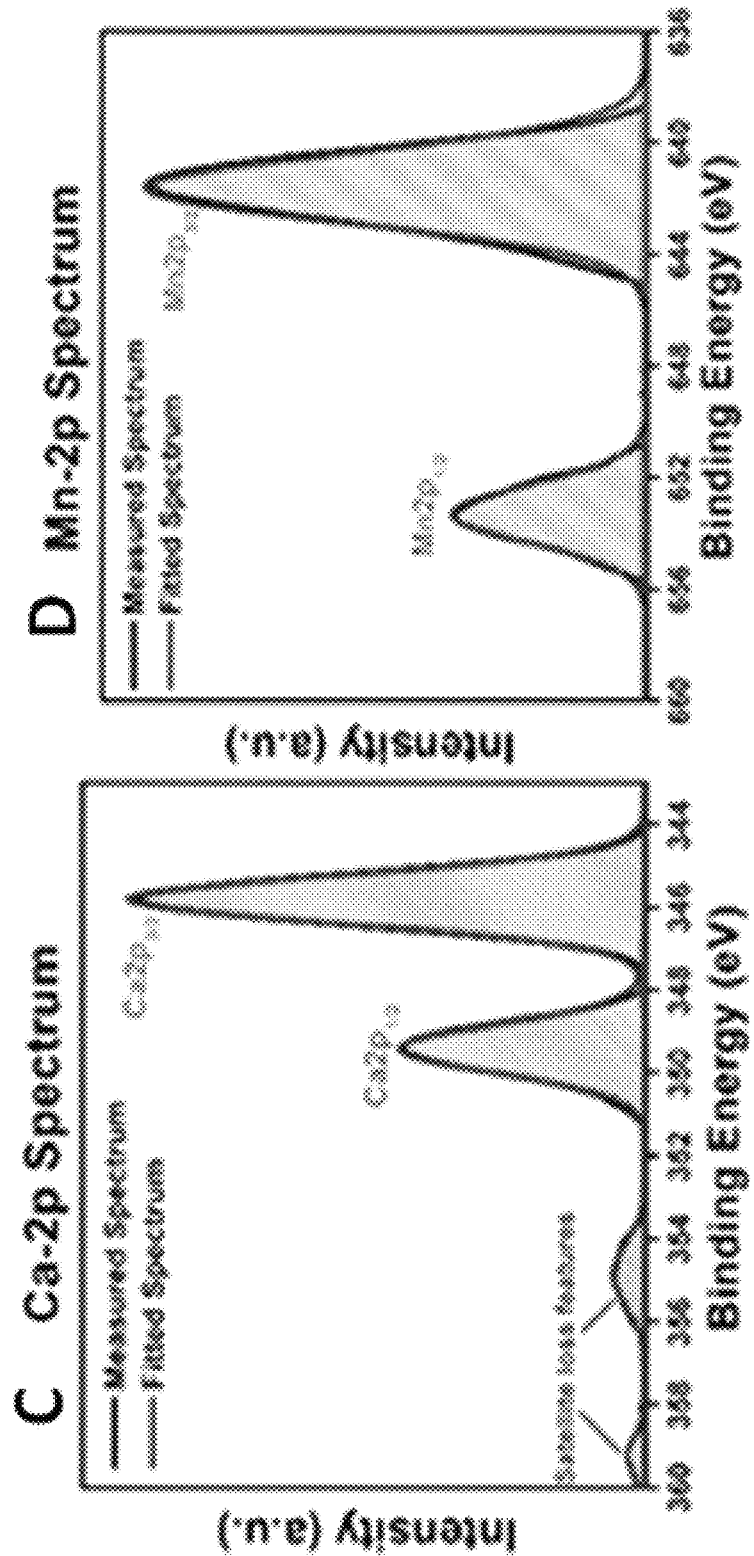
Figures 10E, 10F:
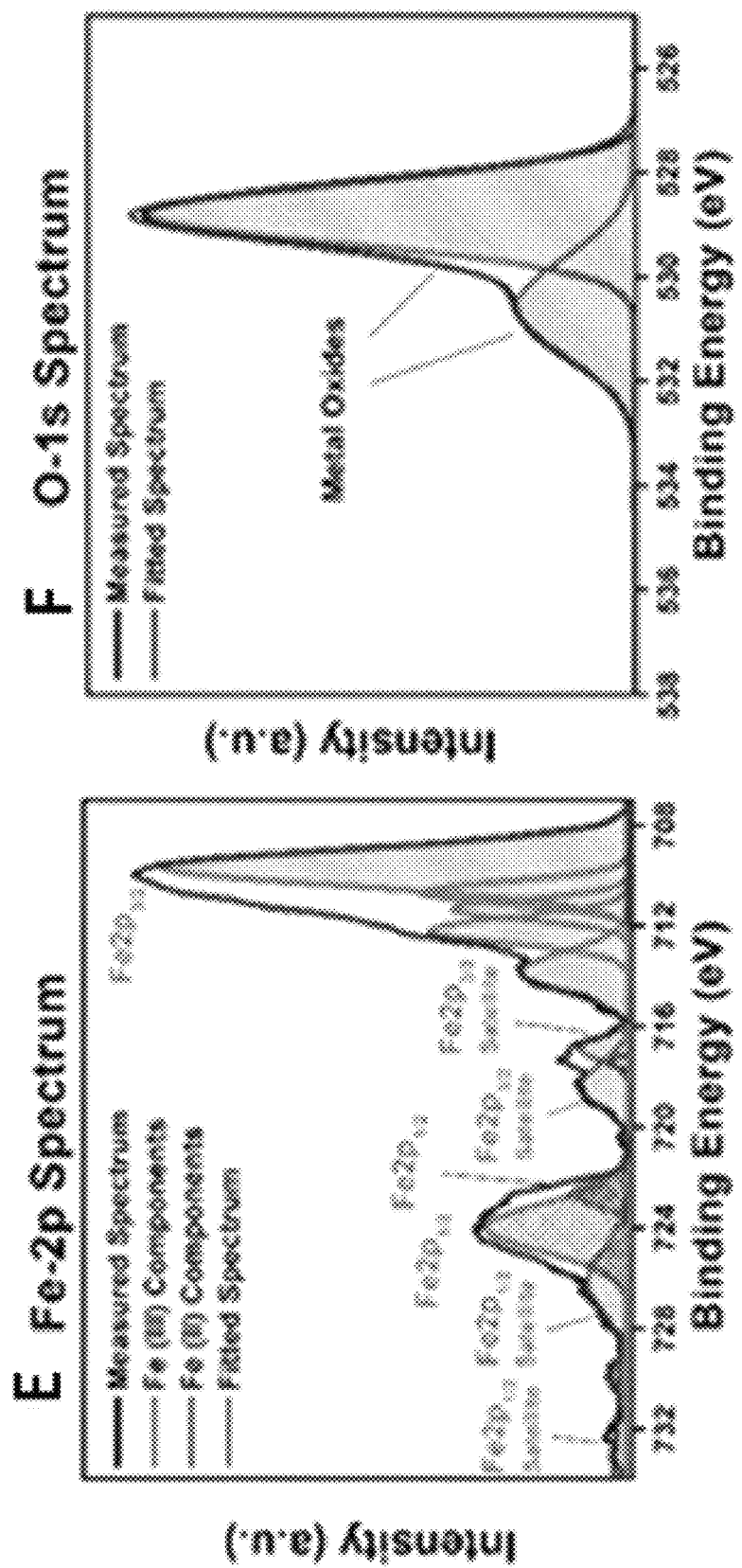
Figure 11A:
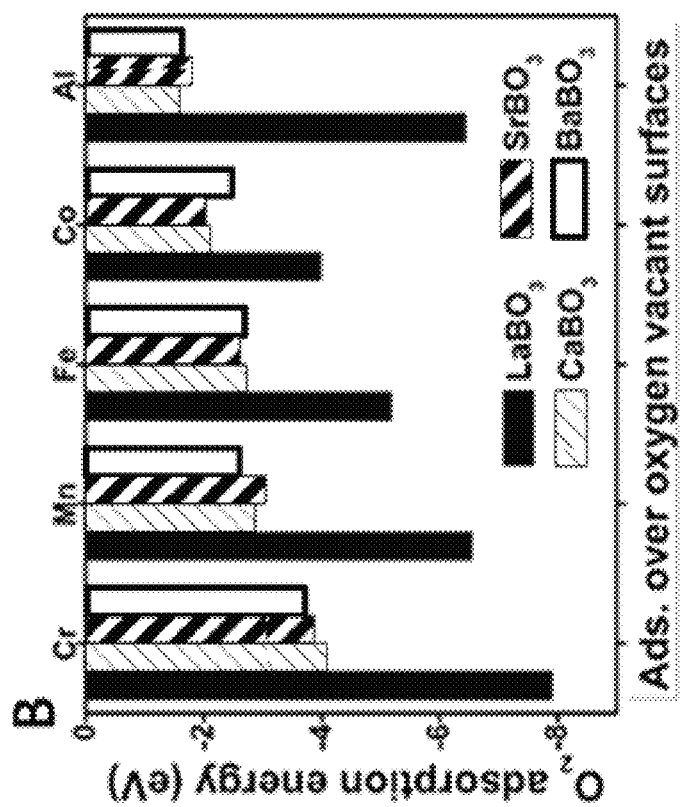
FIGS. 11A-11D show $O_2$ adsorption strengths over pure stoichiometric and oxygen vacant perovskite oxides.
Figure 11B:
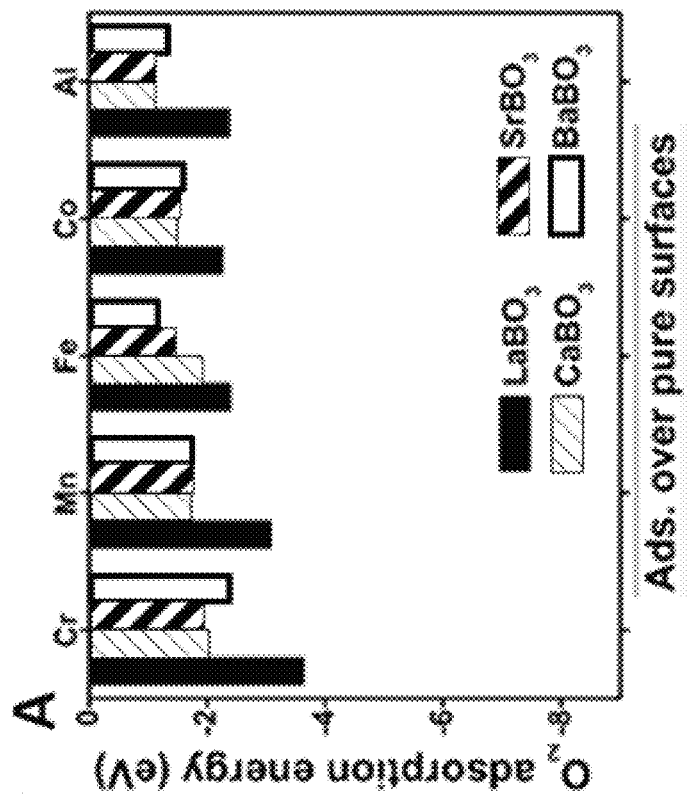
Figure 11C:
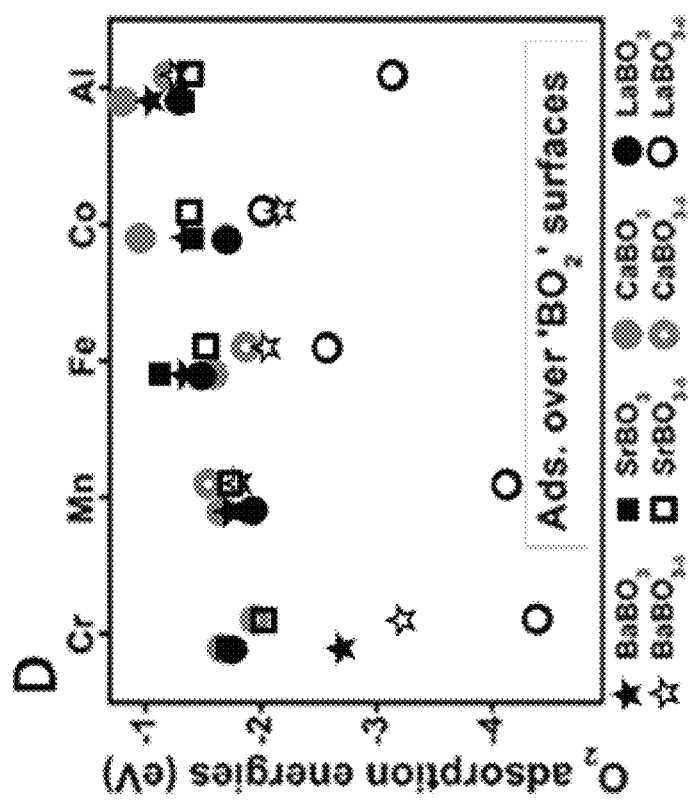
Figure 11D:
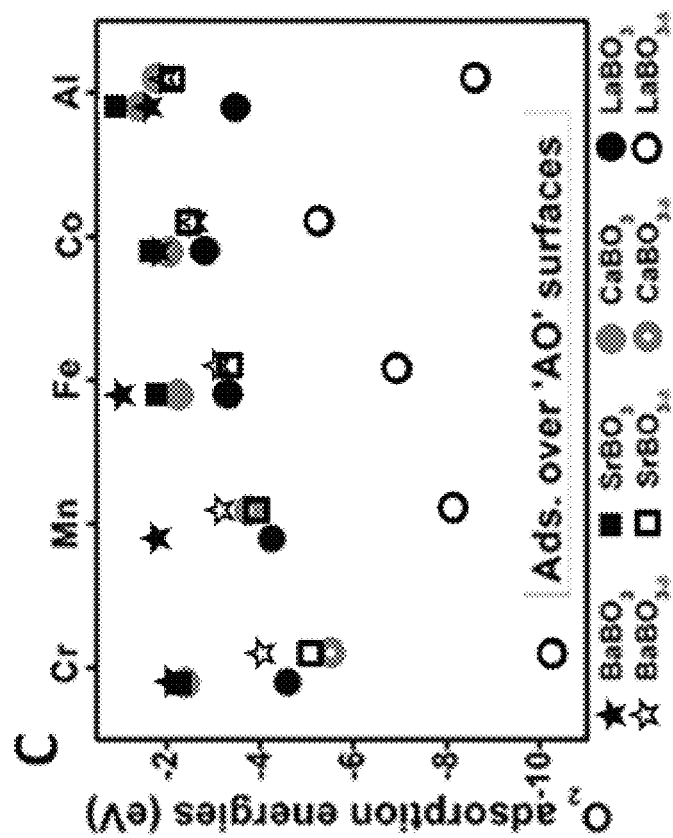

Though, no major change in the bulk phase composition and crystallinity was observed in the samples, the XPS results of the samples revealed several surface insights. FIGS. 10B-10F reveal the typical profiles of La-3d, Ca-2p, Mn-2p, Fe-2p, and O-1s orbitals of $La_{0.6}Ca_{0.4}Fe_{0.4}Mn_{0.6}O_3$. The change in surface composition of these materials before and after the RWGS-CL cycles is depicted in FIG. 10A. As reported in literature, we observe strontium enrichment at the surface of the LSF crystal. This accounts for interlayer diffusion of the lanthanum and strontium near the perovskite oxide surface. However for both $La_{0.6}Ca_{0.4}MnO_3$ and $La_{0.6}Ca_{0.4}Fe_{0.4}Mn_{0.6}O_3$, we observe a different trend of lanthanum enrichment at the surface. Along with these, iron becomes more predominant on the surface of $La_{0.6}Ca_{0.4}Fe_{0.4}Mn_{0.6}O_3$. These surface enrichment of selective elements portray the role of these La—O and Fe—O based surface terminations towards increased $CO_2$ conversion performance than in LSF. The La 3d scan has a $3d_{5/2}$ peak binding energy at 833.15 eV, confirming the presence of a $La_2O_3$ state. The $3d_{5/2}$ multiplet splitting has a difference of ~4.4 eV, which is expected for the $La_2O_3$ state. The La $3d_{3/2}$ peak binding energy is at 850.02 eV. The Ca 2p scan has a $2p_{3/2}$ peak binding energy at 345.77 eV.[59] The Ca $2p_{1/2}$ has a peak at 349.35 eV. The delta is 3.58 eV, which is an expected spin-orbit split for carbonate components. There are satellite loss features observed, which are typically present for $CaCO_3$. These are located around ~355 and ~359 eV. The Fe 2p scan has a $2p_{3/2}$ binding energy peak at 710.05 eV, corresponding top Fe (III). Fe $2p_{1/2}$ around 723-724 eV marks the presence of both Fe (II) and Fe (III) components. Fe $2p_{3/2}$ satellite peaks for both Fe (II) and Fe (III) are visible around 716-719 eV range. The Mn 2p scan has a $2p_{3/2}$ peak binding energy at 641.55 eV. At ~647 eV a very mild MnO satellite feature is present, which portends towards a slight presence of Mn (II) phase along with dominant Mn (III) or Mn (IV) phases. Two close O1s peaks are located near 531 and 529, which is expected for metal oxides.

Figure 12:
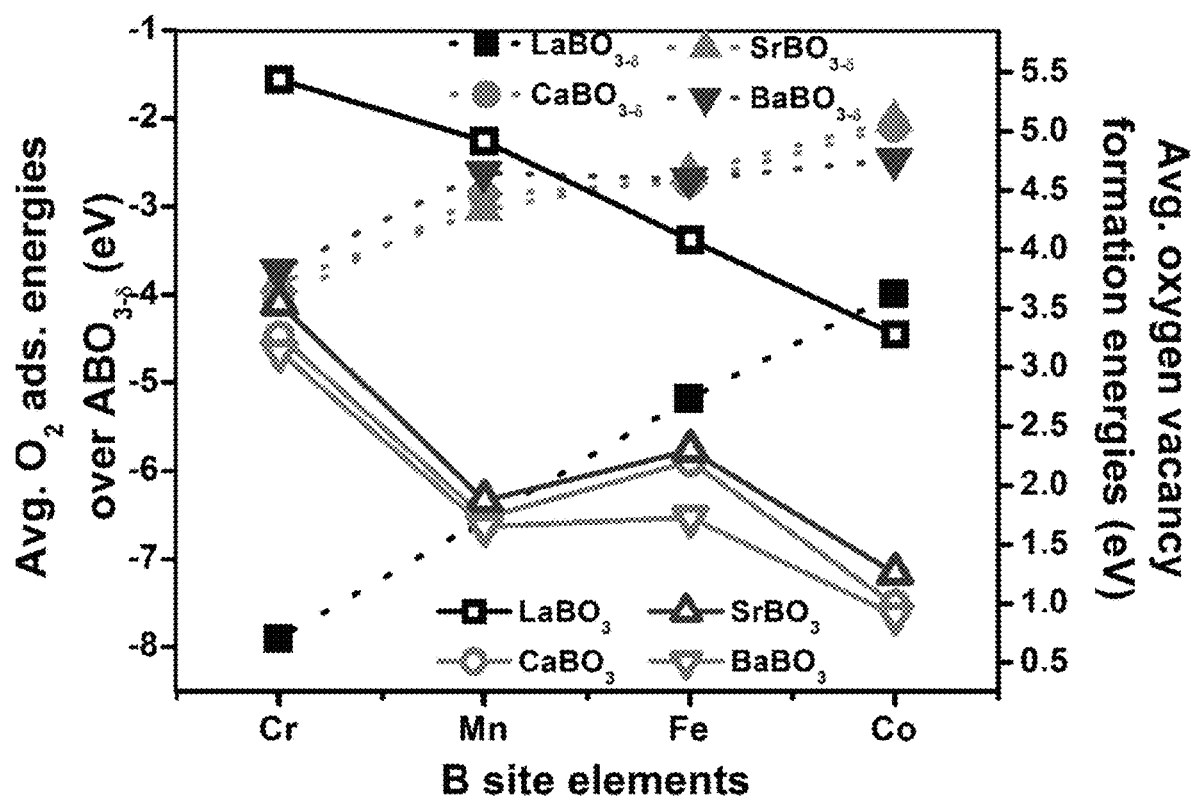
FIG. 12 shows a comparison of oxygen vacancy formation energy ($E_{vac}$) and $O_2$ adsorption energy ($E_{ads}$) over perovskite oxides ($ABO_3$): dotted line represents the $E_{ads}$ while solid lines represent $E_{vac}$. The decreasing trend of both the material properties led us to propose $E_{vac}$ as the sole descriptor for RWGS-CL. Too high $E_{vac}$ represents the reluctance of materials to lose oxygen thereby requiring high temperatures for the reduction process. While too low $E_{vac}$ values mark easy formation of vacancies (can be generated at low temperatures) with materials being too stable in oxygen-deficient forms to convert $CO_2$ to CO. Thus, this calls for an optimum $E_{vac}$ (which translates to optimum $E_{ads}$) which can allow $CO_2$ conversion at sustainable temperatures.

Oxygen vacancy formation energy ($E_{vac}$) essentially describes the vacancy creation step of the RWGS-CL process. For the $CO_2$ splitting step over these oxygen deficient perovskite surfaces, $CO_2$ adsorption energy ($E_{ads}$) is an appropriate descriptor. $CO_2$ adsorption energies have been related to $CO_2$ conversion in RWGS-CL. For any thermochemical approach, the oxidation step of the perovskite oxide is governed by that material's oxygen affinity. This phenomenon is not limited to $CO_2$ splitting, but is applicable for water splitting as well. For all these similar processes, the surface metal on the perovskite should exhibit strong oxygen affinity so as to induce C—O or H—O bond dissociation (corresponding to $CO_2$ and $H_2O$ splitting). Since oxygen vacancy formation energy probes the energy demand of the material to create an oxygen vacancy, we believe it should exhibit similar trends to $O_2$ adsorption energy over these oxygen vacant materials. $O_2$ adsorption energy can thus be a good descriptor for oxidation step of thermochemical looping processes. Henceforth, we calculated oxygen adsorption energies ($E_{ads}$) on pure stoichiometric and oxygen vacant (100) surfaces of $ABO_3$ perovskite oxides to gain insights into the reaction mechanisms. Moreover, the trends of $CO_2$ adsorption energies can be obtained through C and O adsorption energies due to scaling relations. Since, C adsorption trend follows a similar trend as that of O adsorption,[64, 65] we limited our investigation to only $O_2$ adsorption energy as a model for adsorption energy of any oxygen containing gases. We studied the two dominant crystal facet terminations—'AO' (having only 'A' site atoms and oxygen) and '$BO_2$' (having only 'B' site atoms and oxygen). FIGS. 11A-11D show that $E_{ads}$ is significantly larger on oxygen vacant surfaces irrespective of composition of the surface. Stronger $O_2$ adsorption on these surfaces allows for easier C—O bond dissociation, proving the necessity of oxygen vacancies for better $CO_2$ reduction reaction rates. $E_{ads}$ trend across the 'B' site transition metals is also similar to that of $E_{vac}$ trend. Thus, any material reluctant to form oxygen vacancies would have strong $O_2$ adsorption, presenting a perfect platform for dissociation of adsorbed gas molecules. On the contrary, too high an oxygen vacancy formation energy portends an energy intensive process (as shown in FIG. 12). Hence, an optimum regime of oxygen vacancy formation energy (or $O_2$ adsorption energy) exists that allows for sustainable conversion of $CO_2$. This similarity of trends on $E_{vac}$ and $O_2$ adsorption energy establishes $E_{vac}$ as an appropriate descriptor not only for the oxygen vacancy creation step for RWGS-CL, but also for the entire RWGS-CL process as a whole. In particular, 'AO' facets are more favorable for $CO_2$ conversion than the '$BO_2$' facets. In particular, La—O based surface is favored for $O_2$ adsorption, implying better $CO_2$ conversion reactions over these surfaces. This goes to explain the reason for increased $CO_2$ conversion over $La_{0.6}Ca_{0.4}MnO_3$ and $La_{0.6}Ca_{0.4}Fe_{0.4}Mn_{0.6}O_3$ perovskites over LSF, as those revealed dominance of lanthanum over calcium at the crystal surface (per FIG. 10A). Hence, synthesis techniques which target AO facets are indicated for improved $CO_2$ conversion performance. These insights are not merely limited to RWGS-CL application but can be translated to other surface reactions over perovskite oxides involving oxygen evolution or oxygen reduction.

Figure 13A:
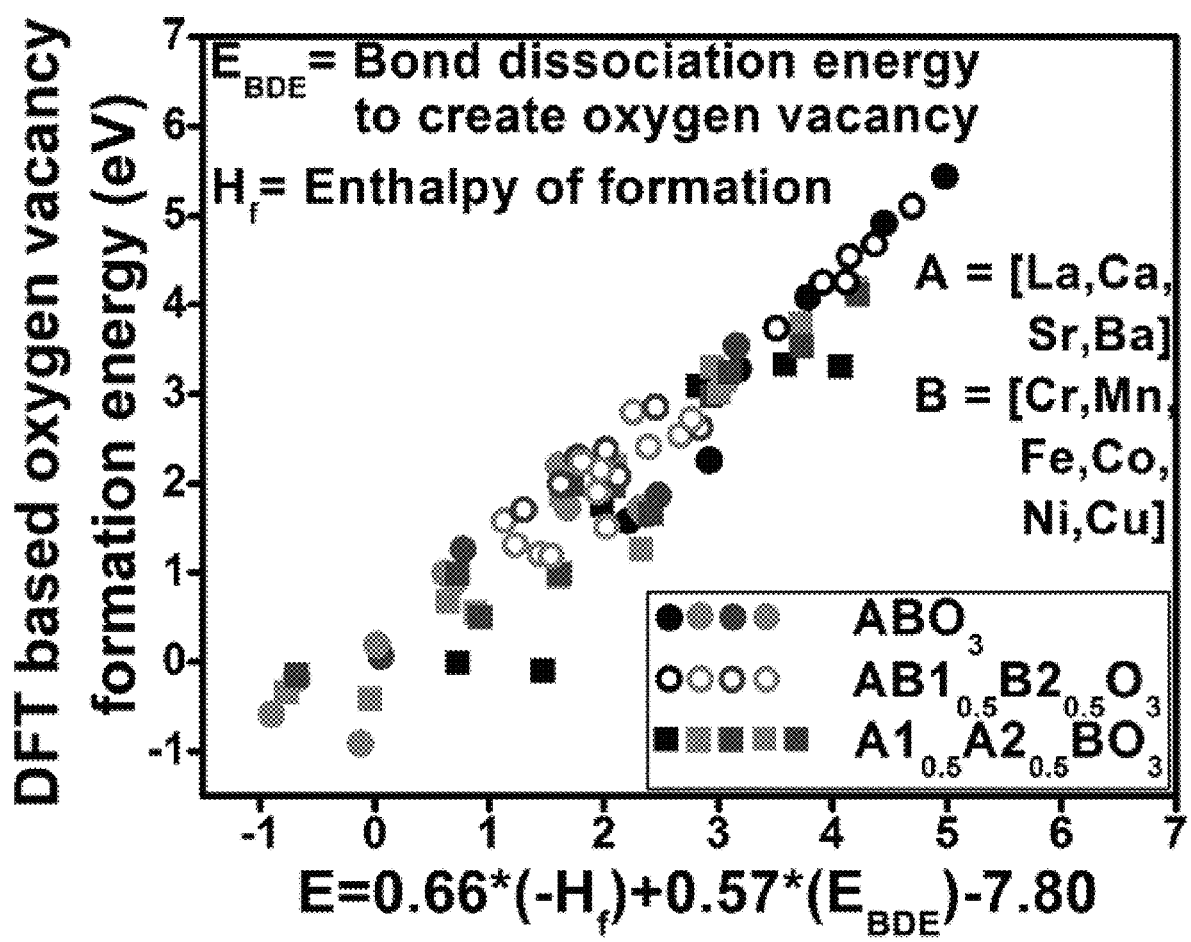
FIGS. 13A-13B show empirical modeling of oxygen vacancy formation energies ($E_{vac}$) (FIG. 13A) DFT-computed energies ($E_{vac}$) for $ABO_3$, $Al_{0.5}A2_{0.5}BO_3$, and $AB1_{0.5}B2_{0.5}O_3$ were fitted to enthalpy of formation (Hf) and bond dissociation energies ($E_{BDE}$).
Figure 13B:
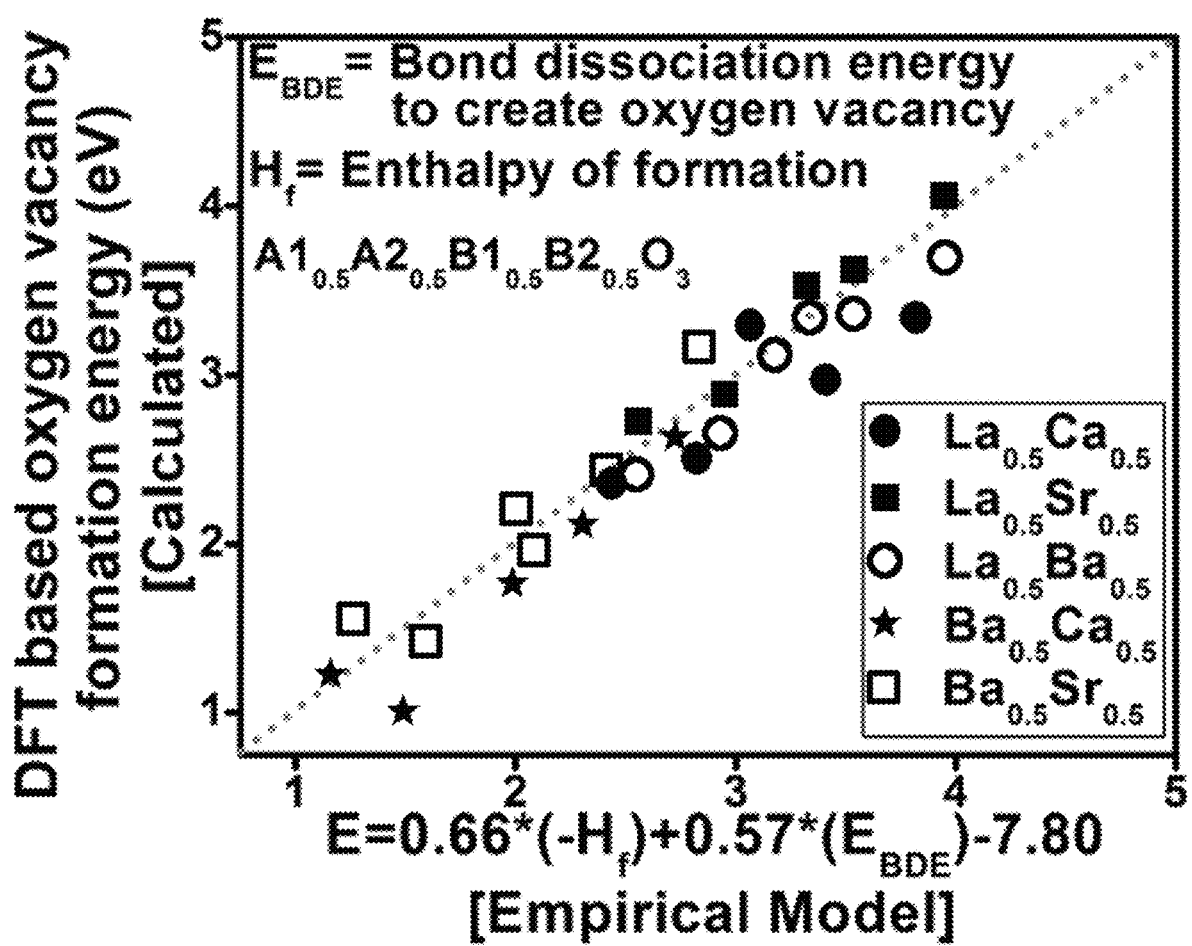
Figures 14A, 14B, 14C, 14D:
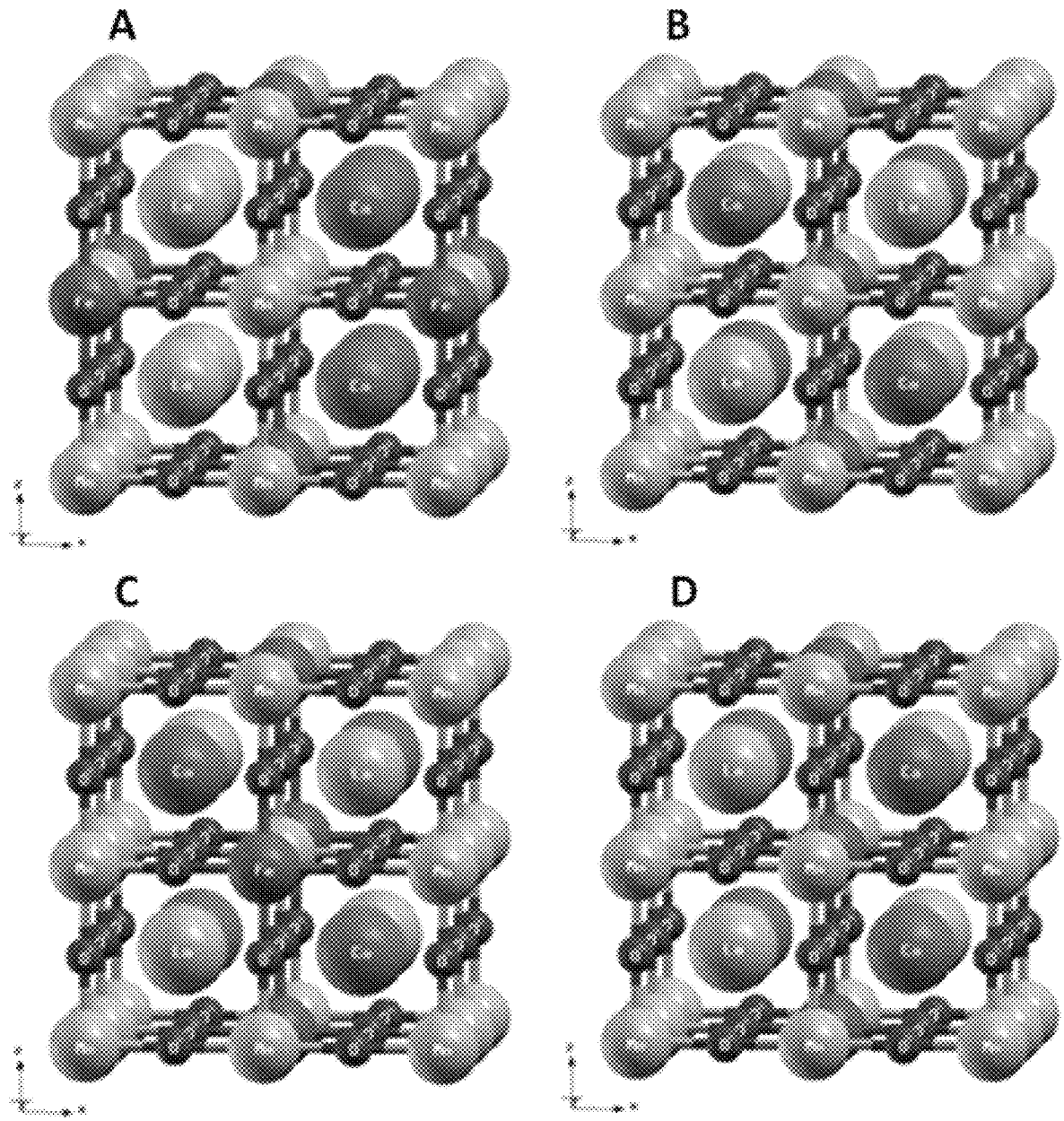
FIGS. 14A-14F show lattice configuration dependent oxygen vacancy formation energy ($E_{vac}$) variation for $La_{0.5}Ca_{0.5}Mn_{0.75}Fe_{0.25}O_3$ perovskite oxide. Site weighted oxygen vacancy formation energy ($E_{vac-wt\_avg}$) and oxygen vacancy formation energy at the least resistant site ($E_{vac-min}$) for different atomic orderings (FIG. 14A-14F) in the crystal lattice of $La_{0.5}Ca_{0.5}Mn_{0.75}Fe_{0.25}O_3$.
Figures 14E, 14F:
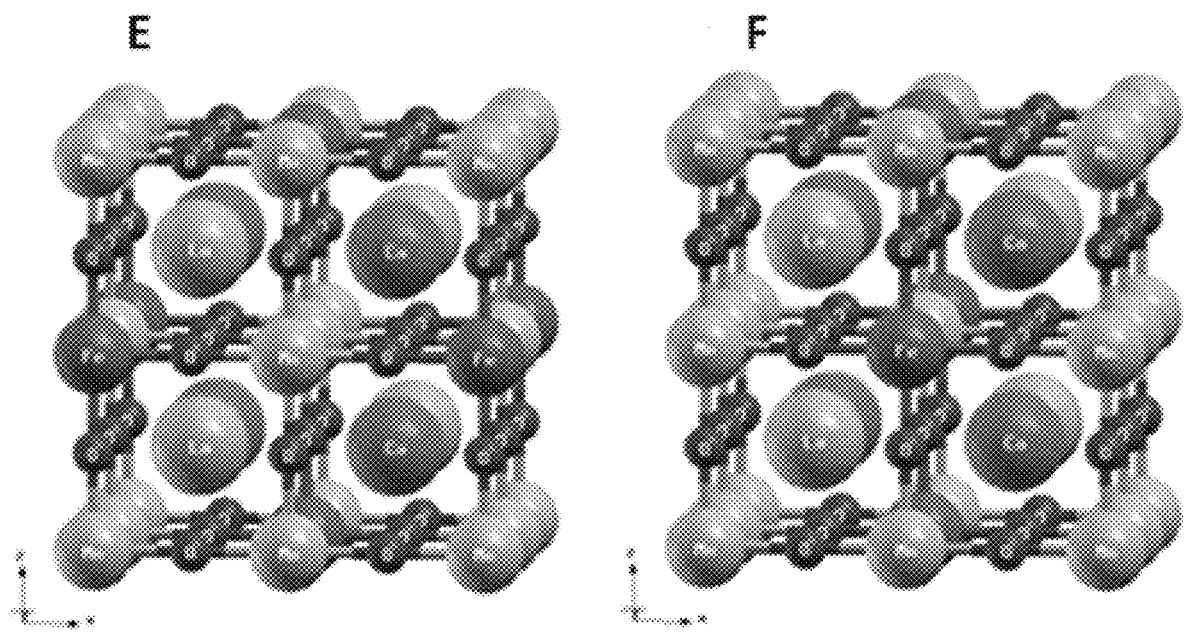
Figures 15A, 15B, 15C, 15D, 15E, 15F:
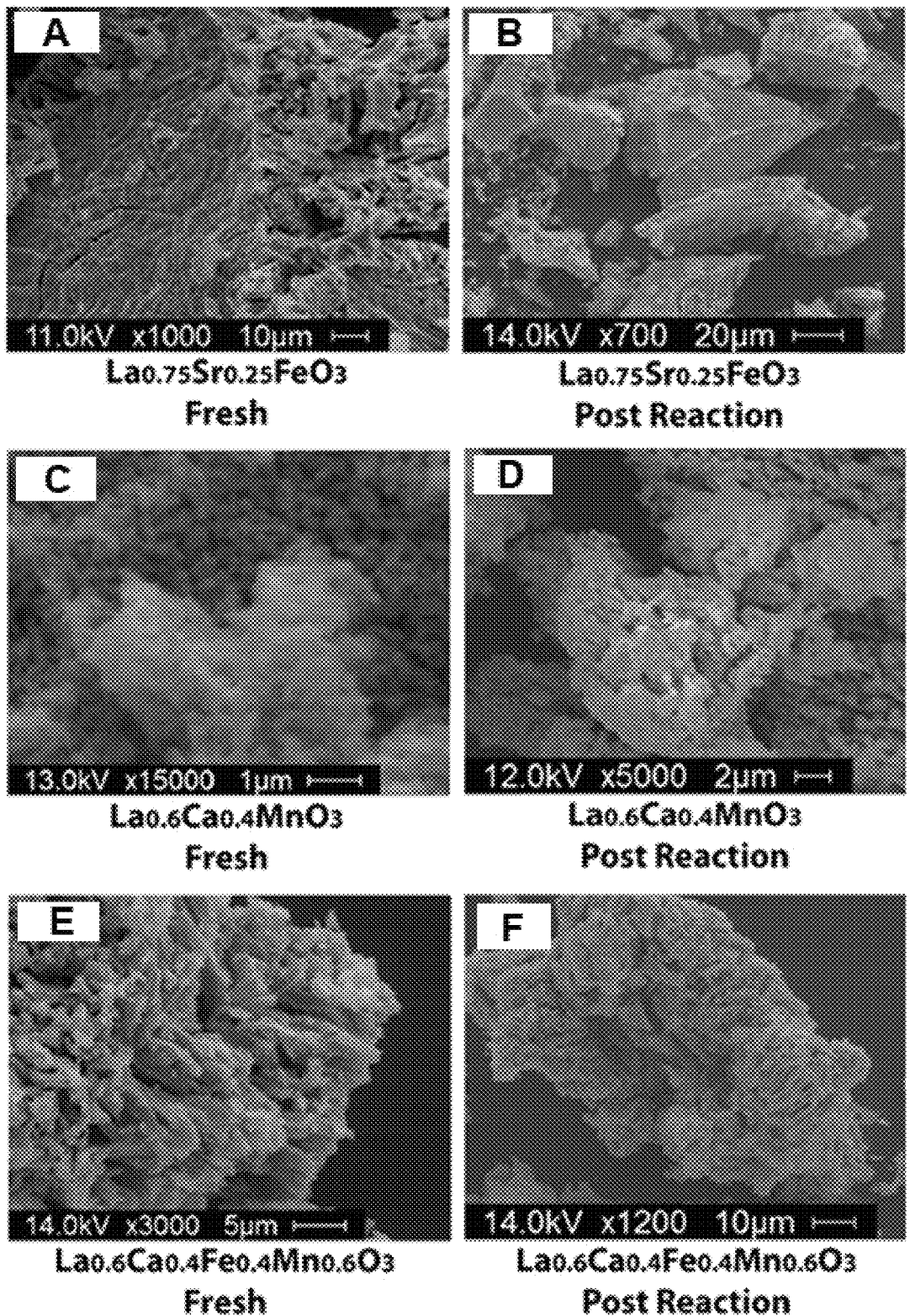
FIGS. 15A-15F show SEM images of different perovskite oxides at two different conditions: Freshly prepared (FIG. 15A, FIG. 15C, FIG. 15E) and at post reaction condition (FIG. 15B, FIG. 15D, FIG. F). Three different samples showing good $CO_2$ conversion performance were probed—$La_{0.75}Sr_{0.25}FeO_3$ (FIGS. 15A-15B), $La_{0.6}Ca_{0.4}MnO_3$ (FIGS. 15C-15D), and $La_{0.6}Ca_{0.4}Fe_{0.4}Mn_{0.6}O_3$ (FIGS. 15E-15F).

For any application, the intrinsic properties of a material behold the possibility of explaining that material's performance. For any catalytic reactions, material properties like oxygen vacancy formation energy ($E_{vac}$), enthalpy of formation ($-H_f$), net electronegativity difference of the metal and the reactant, bond-dissociation energies ($E_{BDE}$), band gap ($E_g$), transition metal 3d band center, surface density of the transition-metals, oxidation state of the surface atoms, $O_2$ adsorption energies, $CO_2$ adsorption energies, other gas adsorption energies, surface enrichment of key transition metals are the usual governing parameters that can explain that material's catalytic behavior. For this particular process (RWGS-CL), oxygen vacancy creation and oxygen affinity towards refilling the vacancies are the key steps to consider. Since the decreasing trend of $E_{vac}$ matches closely with decreasing trend of $E_{ads}$ (as evident from FIG. 12), we conclude $E_{vac}$ has the potential to be the sole descriptor of this process for identifying materials with optimum $E_{vac}$ (which also results in desired $O_2$ adsorption properties). It is thus best said that $E_{vac}$ can solely describe RWGS-CL process and is capable of predicting the $CO_2$ conversion ability of perovskite oxides. Much intricate and accurate quantification of the $CO_2$ conversion performance can be provided once we delve into the surface termination effects of each material. Investigation of these surface characteristics along with the relevant kinetic parameters (particle size, porosity, oxygen/ionic diffusivity etc.) can shed insights on the variation of CO yields of different predicted perovskite oxides as shown in FIG. 5B. Recent efforts have been put forward to synthesize selective terminations over perovskite oxides. These predicted new materials thus pave the way for further in-depth study of each material-set towards achieving enhanced performance for different catalytic reactions. It would be productive to unravel the dependence of DFT computed $E_{vac}$ of a material on its intrinsic properties. Oxygen vacancy formation in a lattice comprises of breaking of 'A-O' and 'B—O' bonds associated with the lattice oxygen being removed and the subsequent relaxation of the oxygen deficient material. Bond dissociation energies provide insights into the energy requirement for 'A-O' and 'B—O' bond cleavage, while the enthalpy of formation of a material correlates with the stability of the material. Hence, solely based on these simple parameters, an empirical model (FIG. 13A) is fitted to the DFT-computed $E_{vac}$ values for $ABO_3$, $Al_{0.5}A2_{0.5}BO_3$, and $ABl_{0.5}B2_{0.5}O_3$. The multiple linear regression technique used for fitting a model $E_{vac}=\beta_0+\beta_1 H_f+\beta_1 E_{BDE}$ produced an adjusted $R^2$ value of 0.90. The model was then utilized to predict $E_{vac}$ of $Al_{0.5}A2_{0.5}Bl_{0.5}B2_{0.5}O_3$ and was found to closely match the DFT-calculated data (FIG. 13B). The mean absolute error (MAE) between the DFT-calculated values and the model is 0.188 eV. This model is simple and can be computed from easily available $E_{BDE}$ values and does not require expensive band-gap based calculations. This model provides general guidelines for prediction of any other perovskite oxides for $CO_2$ conversion purposes and also for other oxygen vacancy driven applications.

The $CO_2$ conversion approach presented herein enables large scale implementation. The provided perovskites are Earth abundant and stable, which will keep operational costs low. Results herein have demonstrated superior $CO_2$ conversion performance via RWGS-CL at the lowest ever temperatures (~450° C.). The feasibility of these process is demonstrated over several material compositions of perovskite oxides. Operational temperatures can be further lowered to ~400° C. to enable thermal integration with the subsequent FTS process.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

REFERENCES

1. J. Gibbins, H. Chalmers, Carbon capture and storage. Energy Policy 36, 4317-4322 (2008).
2. I. E. Agency, Carbon Capture and Storage: The solution for deep emissions reductions. 2015.
3. G. J. M. Jos G. J. Olivier, Marilena Muntean, Jeroen A. H. W. Peters, "Trends in Global $CO_2$ emissions," (2015).
4. P. Markewitz et al., Worldwide innovations in the development of carbon capture technologies and the utilization of $CO_2$. Energy & Environmental Science 5, 7281-7305 (2012).
5. D. Cheng, F. R. Negreiros, E. Apra, A. Fortunelli, Computational approaches to the chemical conversion of carbon dioxide. ChemSusChem 6, 944-965 (2013).
6. G. Centi, S. Perathoner, Opportunities and prospects in the chemical recycling of carbon dioxide to fuels. Catalysis Today 148, 191-205 (2009).
7. C.-F. Chen et al., Oxygen-deficient BaTiO3-x perovskite as an efficient bifunctional oxygen electrocatalyst. Nano Energy 13, 423-432 (2015).
8. W. C. Chueh et al., High-Flux Solar-Driven Thermochemical Dissociation of CO2 and H2O Using Nonstoichiometric Ceria. Science 330, 1797-1801 (2010).
9. P. Furler et al., Solar thermochemical CO2 splitting utilizing a reticulated porous ceria redox system. Energy & Fuels 26, 7051-7059 (2012).
10. P. Furler, J. R. Scheffe, A. Steinfeld, Syngas production by simultaneous splitting of H2O and CO2 via ceria redox reactions in a high-temperature solar reactor. Energy & Environmental Science 5, 6098-6103 (2012).
11. D. S. Mallapragada, N. R. Singh, V. Curteanu, R. Agrawal, Sun-to-Fuel Assessment of Routes for Fixing CO2 as Liquid Fuel. Industrial & Engineering Chemistry Research 52, 5136-5144 (2013).
12. Y. A. Daza, R. A. Kent, M. M. Yung, J. N. Kuhn, Carbon dioxide conversion by reverse water gas shift chemical looping on perovskite-type oxides. Industrial & Engineering Chemistry Research 53, 5828-5837 (2014).
13. Y. A. Daza, D. Maiti, R. A. Kent, V. R. Bhethanabotla, J. N. Kuhn, Isothermal reverse water gas shift chemical looping on La0.75Sr0.25Co(1-Y)FeYO3 perovskite type oxides. Catalysis Today 258, 2, 691-698 (2015).
14. M. Wenzel, L. Rihko-Struckmann, K. Sundmacher, Thermodynamic analysis and optimization of RWGS processes for solar syngas production from CO2. AIChE Journal 63, 15-22 (2016).
15. M. A. Pena, J. L. G. Fierro, Chemical Structures and Performance of Perovskite Oxides. Chemical Reviews 101, 1981-2017 (2001).
16. A. T. R. Simon, High-temperature structural phase transitions in perovskite (CaTiO3). Journal of Physics: Condensed Matter 8, 8267-8275 (1996).
17. S. Švarcová, K. Wiik, J. Tolchard, H. J. M. Bouwmeester, T. Grande, Structural instability of cubic perovskite BaXSr1-XCo1-YFeYO3-δ. Solid State Ionics 178, 1787-1791 (2008).
18. D. Maiti, Y. A. Daza, M. M. Yung, J. N. Kuhn, V. R. Bhethanabotla, Oxygen vacancy formation characteristics in the bulk and across different surface terminations of La(1-x)SrxFe(1-y)CoyO(3-d) perovskite oxides for CO2 conversion. Journal of Materials Chemistry A 4, 5137-5148 (2016).
19. A. M. Deml et al., Tunable Oxygen Vacancy Formation Energetics in the Complex Perovskite Oxide SrxLa1-xMnyAl1-yO3. Chemistry of Materials 26, 6595-6602 (2014).
20. A. M. Deml, A. M. Holder, R. P. O'Hayre, C. B. Musgrave, V. Stevanovic, Intrinsic Material Properties Dictating Oxygen Vacancy Formation Energetics in Metal Oxides. The Journal of Physical Chemistry Letters 6, 1948-1953 (2015).
21. M. T. Curnan, J. R. Kitchin, Effects of Concentration, Crystal Structure, Magnetism, and Electronic Structure Method on First-Principles Oxygen Vacancy Formation Energy Trends in Perovskites. Journal of Physical Chemistry C 118, 28776-28790 (2014).
22. A. H. Bork, M. Kubicek, M. Struzik, J. L. M. Rupp, Perovskite La$_{0.6}$Sr0.4Cr1-xCoxO3-d solid solutions for solar-thermochemical fuel production: strategies to lower the operation temperature. Journal of Materials Chemistry A 3, 15546-15557 (2015).
23. J. R. Scheffe, D. Weibel, A. Steinfeld, Lanthanum-Strontium-Manganese Perovskites as Redox Materials for Solar Thermochemical Splitting of H2O and 002. Energy & Fuels 27, 4250-4257 (2013).
24. M. Popa, M. Kakihana, Synthesis of lanthanum cobaltite (LaCoO3) by the polymerizable complex route. Solid State Ionics 151, 251-257 (2002).
25. N. G. A. Earnshaw, Chemistry of the Elements. (Elsevier, 1997).
26. P. Hohenberg, W. Kohn, Inhomogeneous Electron Gas. Physical Review 136, B864-B871 (1964).
27. W. Kohn, L. J. Sham, Self-Consistent Equations Including Exchange and Correlation Effects. Physical Review 140, A1133-A1138 (1965).
28. G. Kresse, J. Furthmüller, Efficiency of ab-initio total energy calculations for metals and semiconductors using a plane-wave basis set. Computational Materials Science 6, 15-50 (1996).
29. G. Kresse, J. Furthmüller, Efficient iterative schemes for ab initio total-energy calculations using a plane-wave basis set. Physical Review B 54, 11169-11186 (1996).
30. G. Kresse, J. Hafner, Ab initio molecular dynamics for liquid metals. Physical Review B
47, 558-561 (1993).
31. G. Kresse, D. Joubert, From ultrasoft pseudopotentials to the projector augmented-wave method. Physical Review B 59, 1758-1775 (1999).
32. J. P. Perdew, K. Burke, M. Ernzerhof, Generalized Gradient Approximation Made Simple. Physical Review Letters 77, 3865-3868 (1996).
33. H. J. Monkhorst, J. D. Pack, Special points for Brillouin-zone integrations. Physical Review B 13, 5188-5192 (1976).
34. L. Wang, T. Maxisch, G. Ceder, Oxidation energies of transition metal oxides within the GGA+U framework. Physical Review B 73, 195107-195101-195107-195106 (2006).
35. Y. R. Luo, Comprehensive Handbook of Chemical Bond Energies. (Taylor & Francis, 2007).
36. Y. Izumi, Recent advances in the photocatalytic conversion of carbon dioxide to fuels with water and/or hydrogen using solar energy and beyond. Coordination Chemistry Reviews 257, 171-186 (2013).
37. Y. A. Daza, D. Maiti, B. J. Hare, V. R. Bhethanabotla, J. N. Kuhn, More Cu, more problems: Decreased CO2 conversion ability by Cu-doped La0.75Sr0.25FeO3 perovskite oxides. Surface Science 648, 92-99 (2015).

We claim:

1. A perovskite oxide having a composition according to the formula $$A^1_x A^2_{(1-x)} B^1_y B^2_{(1-y)} O_3;$$

wherein x is about 0.2 to 0.8;
wherein y is about 0.2 to 0.8;
wherein $A^1$ and $A^2$ are independently selected from the group consisting of La, Ca, and Ba, provided that $A^1$ and $A^2$ are not the same;
wherein $B^1$ and $B^2$ are independently transition metals, provided that $B^1$ and $B^2$ are not the same.

2. The perovskite oxide according to claim 1, wherein $B^1$ and $B^2$ are independently selected from the group consisting of Al, Fe, Mn, Cr, and Co.

3. The perovskite oxide according to claim 2, wherein $A^1$ is La.

4. The perovskite oxide according to claim 2, wherein x is about 0.3 to 0.7.

5. The perovskite oxide according to claim 4, wherein y is about 0.4 to 0.6.

6. A method of converting carbon dioxide to carbon monoxide, the method comprising contacting a perovskite according to claim 1 with hydrogen gas at a first elevated temperature to produce an oxygen-deficient perovskite oxide, and
contacting the oxygen-deficient perovskite oxide with the carbon dioxide at a second elevated temperature to produce the carbon monoxide.

7. The method according to claim 6, wherein the first elevated temperature is about 350° C. to 600° C.

8. The method according to claim 7, wherein the second elevated temperature is about 400° C. to about 800° C.

9. The method according to claim 8, wherein the second elevated temperature is about 440° C. to about 550° C.

10. The method according to claim 1, wherein the carbon monoxide is produced at a rate of about 140 µmoles g$^{-1}$ min$^{-1}$ to 275 µmoles g$^{-1}$ min$^{-1}$ based perovskite oxide.

11. The method according to claim 6, wherein the carbon monoxide is produced at a rate of about 140 µmoles g$^{-1}$ min$^{-1}$ to 275 µmoles g$^{-1}$ min$^{-1}$ based upon the mass of the perovskite oxide.

12. A perovskite oxide, having a composition according to the formula $$A^1_x A^2_{(1-x)} B^1_y B^2_{(1-y)} O_3;$$

wherein x is about 0.2 to 0.8;
wherein y is about 0.2 to 0.8;
wherein $A^1$ and $A^2$ are independently selected from the group consisting of La, Ca, and Ba, provided that $A^1$ and $A^2$ are not the same;
wherein $B^1$ and $B^2$ are independently transition metals, provided that $B^1$ and $B^2$ are not the same;
wherein the perovskite oxide is selected from the group consisting of La$_{0.6}$Ca$_{0.4}$Fe$_{0.4}$Mn$_{0.6}$O$_3$, La$_{0.6}$Ca$_{0.4}$Al$_{0.4}$Mn$_{0.6}$O$_3$, La$_{0.6}$Ba$_{0.4}$Fe$_{0.6}$Al$_{0.4}$O$_3$, La$_{0.6}$Ca$_{0.4}$Cr$_{0.4}$Mn$_{0.6}$O$_3$, La$_{0.6}$Ca$_{0.4}$Cr$_{0.6}$Al$_{0.4}$O$_3$, La$_{0.6}$Ca$_{0.4}$Cr$_{0.6}$Fe$_{0.4}$O$_3$, La$_{0.6}$Ba$_{0.4}$Mn$_{0.6}$Fe$_{0.4}$O$_3$, La$_{0.6}$Ba$_{0.4}$MnO$_3$, La$_{0.6}$Ba$_{0.4}$Mn$_{0.6}$Cr$_{0.4}$O$_3$, La$_{0.6}$Ba$_{0.4}$Cr$_{0.8}$Co$_{0.2}$O$_3$, La$_{0.6}$Ca$_{0.4}$Cr$_{0.8}$Co$_{0.2}$O$_3$, and La$_{0.6}$Ba$_{0.4}$Cr$_{0.6}$Fe$_{0.4}$O$_3$.

13. The perovskite according to claim 1, wherein $B^1$ and $B^2$ are not Co.

14. A catalyst comprising a perovskite oxide according to claim 1, wherein the perovskite oxide has been packed into at least one structure for packing a chemical reactor, wherein the structure is selected from the group consisting of beads, pellets, and fluidized bed powders.

15. The catalyst according to claim 14, wherein the perovskite oxide is supported on a surface of the substrate.

16. The catalyst according to claim 15, wherein the substrate comprises a monolith having the perovskite oxide deposited on at least a surface of the monolith.

17. The catalyst according to claim 16, wherein the monolith comprises platinum, a cordierite, a mullite, and silicon carbide.

18. The catalyst according to claim 16, wherein the monolith has a Brunauer, Emmet, and Teller (BET) specific surface area of about 5 m$^2$/g to about 100 m$^2$/g.

19. A perovskite oxide having a composition according to the formula $A^1_x A^2_{(1-x)} B^1_y B^2_{(1-y)} O_3$;

wherein x is about 0.2 to 0.8;
wherein y is about 0.2 to 0.8;
wherein $A^1$ and $A^2$ are independently selected from the group consisting of La, Ca, and Ba, provided that $A^1$ and $A^2$ are not the same;
wherein $B^1$ and $B^2$ are independently selected from the group consisting of Al, Fe, Mn, and Co, provided that $B^1$ and $B^2$ are not the same.

20. The perovskite oxide according to claim 19, wherein $A^1$ and $A^2$ are independently selected from the group consisting of La, Ca, and Ba, provided that $A^1$ and $A^2$ are not the same;
$B^1$ is Fe; and
$B^2$ is selected from the group consisting of Al and Mn.

* * * * *